(12) United States Patent
Kato

(10) Patent No.: US 10,949,148 B2
(45) Date of Patent: Mar. 16, 2021

(54) PRINT PROCESSING SYSTEM AND CONTROL METHOD

(71) Applicant: CANON KABUSHIKI KAISHA, Tokyo (JP)

(72) Inventor: Hisashi Kato, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/358,332

(22) Filed: Mar. 19, 2019

(65) Prior Publication Data

US 2019/0303076 A1    Oct. 3, 2019

(30) Foreign Application Priority Data

Mar. 29, 2018   (JP) .............................. JP2018-065505

(51) Int. Cl.
*H04N 1/00*      (2006.01)
*G06F 3/12*      (2006.01)

(52) U.S. Cl.
CPC .......... *G06F 3/1254* (2013.01); *G06F 3/1205* (2013.01); *G06F 3/1286* (2013.01)

(58) Field of Classification Search
CPC ..... G06F 3/1254; G06F 3/1286; G06F 3/1205
USPC ...................................................... 358/1.15
See application file for complete search history.

(56) References Cited

U.S. PATENT DOCUMENTS

2011/0080604 A1*   4/2011   Liu ..................... G06F 3/1227
                                                        358/1.13
2015/0277827 A1   10/2015   Oonami

* cited by examiner

*Primary Examiner* — Saeid Ebrahimi Dehkordy
(74) *Attorney, Agent, or Firm* — Canon U.S.A., Inc. IP Division

(57) ABSTRACT

A print processing system includes an image processing apparatus configured to execute print processing, and a client apparatus that includes a class driver configured to convert data as a target of the print processing into print data and to transmit a printing command for causing the image processing apparatus to execute the print processing by using a standard function to the image processing apparatus together with the print data, wherein the client apparatus includes an acquisition unit configured to acquire print setting information that specifies a print setting included in the image processing apparatus from the image processing apparatus via the class driver, a display unit configured to display a print setting screen based on the print setting information acquired by the acquisition unit, and a transmission unit configured to transmit the print setting information about a print setting selected by a user on the print setting screen.

19 Claims, 26 Drawing Sheets

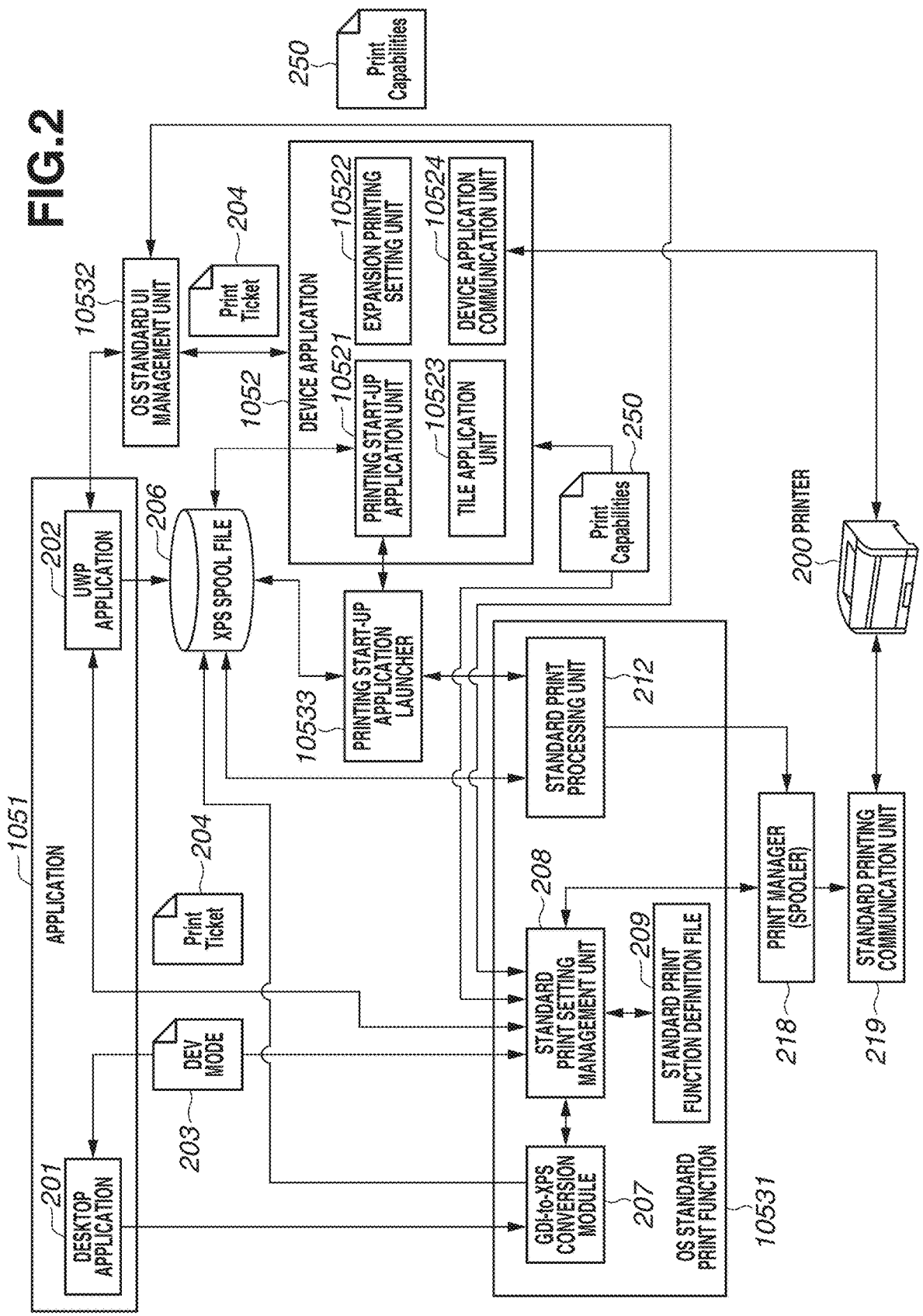

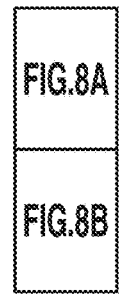
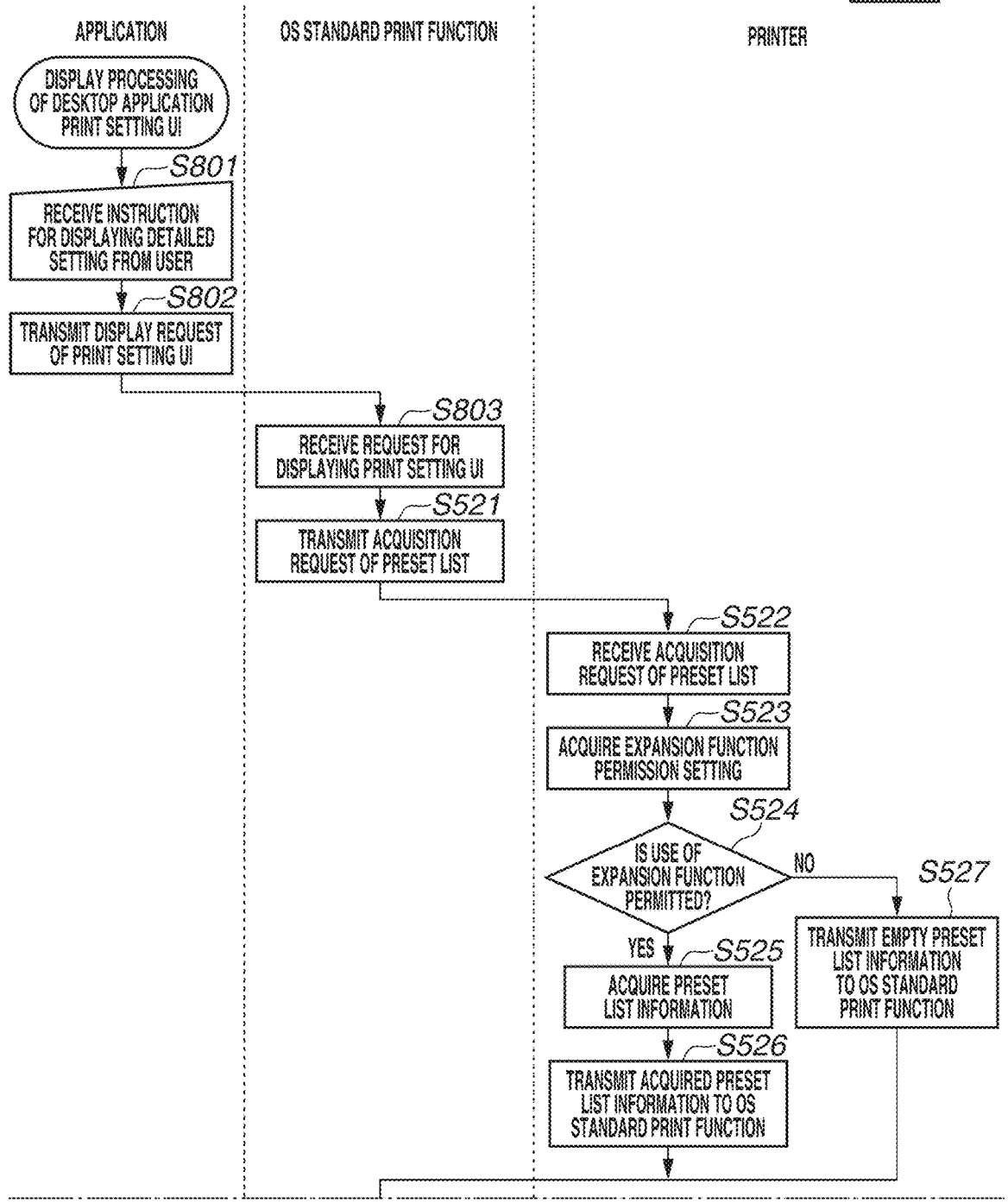
FIG.8A

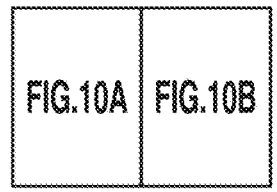
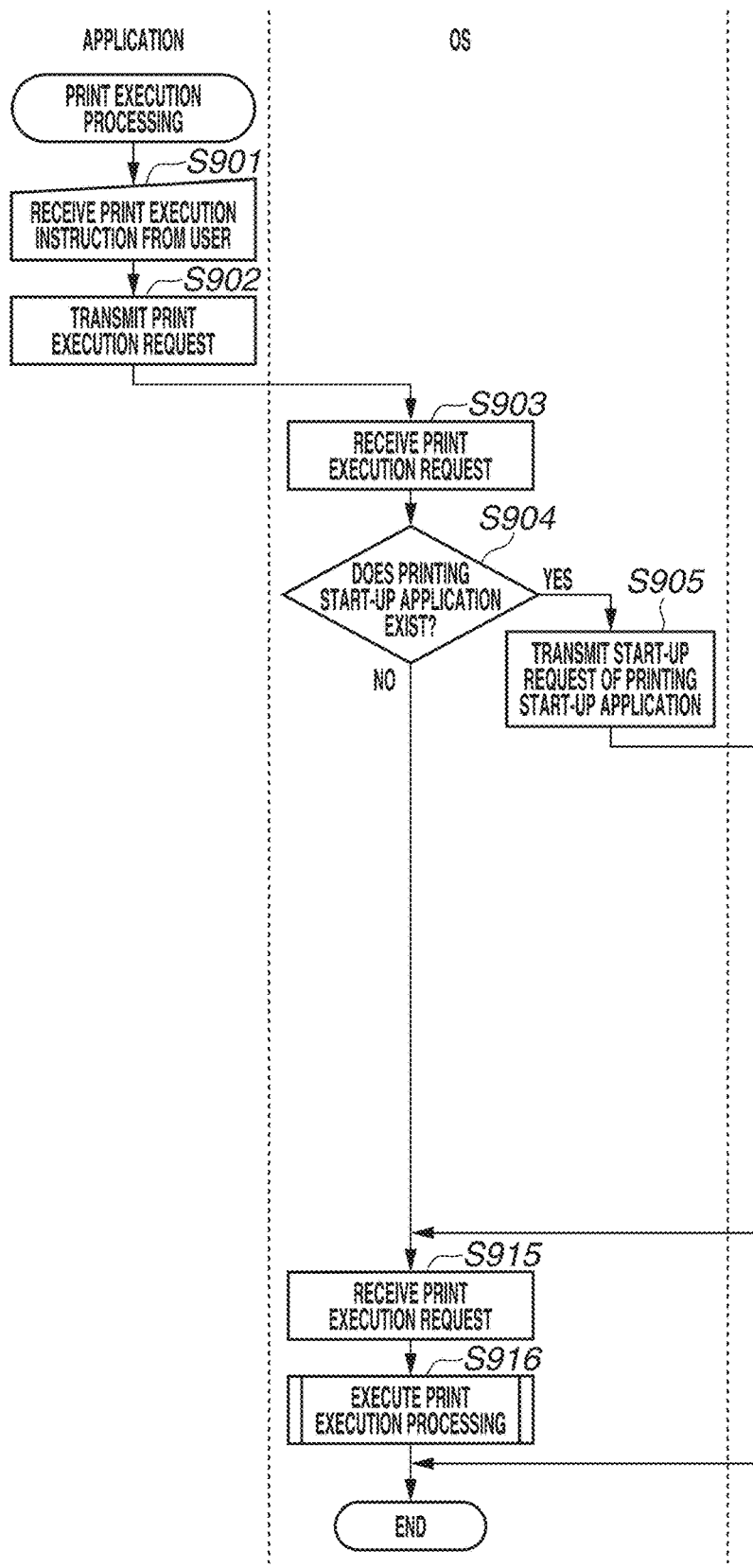

FIG.15C

PRESET REGISTRATION — 1520

REGISTERED PRESET: — 1521
BOX PRINTING · NO. 10
BOOKBINDING PRINTING ·
SADDLE STITCHING

REGISTRATION PRESET NAME: TONER SAVING — 1523

OUTPUT SHEET SIZE: SAME AS DOCUMENT SIZE — 1524
☒ TWO-SIDED PRINTING  ☐ BOOKBINDING PRINTING  ☐ SADDLE STITCHING  ☒ TONER SAVING
☐ PAGE AGGREGATION  [1] 1 in 1
STAPLING  NONE
COLOR MODE  MONOCHROME
☐ BOX PRINTING
DETAILS...

PRESET REGISTRATION — 1522

CLOSE — 1525

FIG.15D

PRESET REGISTRATION — 1530

REGISTERED PRESET:

ⓘ PRESET IS NOT REGISTERED IN PRINTER. MORE FUNCTIONS OF PRINTER CAN BE USED BY REGISTERING PRESET IN PRINTER.

REGISTRATION PRESET NAME: TONER SAVING — 1523

OUTPUT SHEET SIZE: SAME AS DOCUMENT SIZE — 1524
☒ TWO-SIDED PRINTING  ☐ BOOKBINDING PRINTING  ☐ SADDLE STITCHING  ☒ TONER SAVING
☐ PAGE AGGREGATION  [1] 1 in 1
STAPLING  NONE
COLOR MODE  MONOCHROME
☐ BOX PRINTING
DETAILS...

PRESET REGISTRATION — 1522
1521

☐ DO NOT DISPLAY THIS SCREEN NEXT TIME. — 1531

PRINT — 1532
CANCEL — 1533

FIG.16A

```xml
<?xml version="1.0" encoding="utf-8"?>
<psf:PrintCapabilities xmlns:psf="http://2003/08/printing/printschemaframework"
 xmlns:xsi="http://www.w3.org/2001/XMLSchema-instance"
 xmlns:xsd="http://www.w3.org/2001/XMLSchema"
 version="1"
 xmlns:ns0000="http://www.canon.com/ns/printschema/oip/v200"
 xmlns:psk="http://schemas.microsoft.com/windows/2003/08/printing/printschemakeywords"
 xmlns:pskv11="http://schemas.microsoft.com/windows/2013/05/printing/printschemakeywordsv11">
    <psf:Feature name="psk:PageOrientation">                    ~1601
        <psf:Option name="psk:Portrait"/>
        <psf:Option name="psk:Landscape"/>
    </psf:Feature>
    <psf:Feature name="psk:JobPreset">
        <psf:Option name="psk:None">
            <psf:Property name="psk:PresetName">
                <psf:Value xsi:type="xsd:string">OFF</psf:Value>
            </psf:Property>
            <psf:Property name="psk:PresetID">
                <psf:Value xsi:type="xsd:string"></psf:Value>
            </psf:Property>
        </psf:Option>
        <psf:Option name="ns0000:Preset01">
            <psf:Property name="psk:PresetName">
                <psf:Value xsi:type="xsd:string">BOX PRINTING - NO. 10</psf:Value>
            </psf:Property>
            <psf:Property name="psk:PresetID">
                <psf:Value xsi:type="xsd:string">4CF97CE2-8F47-49FE-BFE5-A021EAD1AF8D</psf:Value>
            </psf:Property>
        </psf:Option>
        <psf:Option name="ns0000:Preset02">
            <psf:Property name="psk:PresetName">
                <psf:Value xsi:type="xsd:string">BOOKBINDING PRINTING - SADDLE STITCHING</psf:Value>
            </psf:Property>
            <psf:Property name="psk:PresetID">
                <psf:Value xsi:type="xsd:string">D87A65FB-A4E1-4AFD-938F-4799D50F89F7</psf:Value>
            </psf:Property>
        </psf:Option>
        <psf:Option name="ns0000:Preset03">
            <psf:Property name="psk:PresetName">
                <psf:Value xsi:type="xsd:string">TONER SAVING</psf:Value>
            </psf:Property>
            <psf:Property name="psk:PresetID">
                <psf:Value xsi:type="xsd:string">71CE7D38-403A-4298-8FF4-08858C0A09CD</psf:Value>
            </psf:Property>
        </psf:Option>
    </psf:Feature>
</psf:PrintCapabilities>
```

FIG.16B

```xml
<?xml version="1.0" encoding="utf-8"?>
<psf:PrintTicket xmlns:psf="http://2003/08/printing/printschemaframework"
 xmlns:xsi="http://www.w3.org/2001/XMLSchema-instance"
 xmlns:xsd="http://www.w3.org/2001/XMLSchema"
 version="1"
 xmlns:ns0000="http://www.canon.com/ns/printschema/oip/v200"
 xmlns:psk="http://schemas.microsoft.com/windows/2003/08/printing/printschemakeywords"
 xmlns:pskv11="http://schemas.microsoft.com/windows/2013/05/printing/printschemakeywordsv11">
    <psf:Feature name="psk:PageOrientation">          ~1611
        <psf:Option name="psk:Portrait">
    </psf:Feature>
                                                       1612
    <psf:Feature name="psk:JobPreset">
        <psf:Option name="ns0000:Preset01">
            <psf:Property name="psk:PresetName">
                <psf:Value xsi:type="xsd:string">BOX PRINTING - NO. 10</psf:Value>
            </psf:Property>
            <psf:Property name="psk:PresetID">
                <psf:Value xsi:type="xsd:string">4CF97CE2-8F47-49FE-BFE5-A021EAD1AF8D</psf:Value>
            </psf:Property>
        </psf:Option>
    </psf:Feature>
</psf:PrintTicket>
```

| PRESET NAME | PRESET ID | OUTPUT SHEET | TWO-SIDED PRINTING | COLOR MODE | STAPLING | BOX PRINTING | BOX NO. | BOOKBINDING PRINTING | SADDLE STITCHING | TONER SAVE | START-UP SETTING OF PRINTING START-UP APPLICATION |
|---|---|---|---|---|---|---|---|---|---|---|---|
| BOX PRINTING - NO. 10 | 4CF97CE2-8F47-49FE-BFE5-A021EAD1AF8D | SAME AS DOCUMENT SIZE | ON | COLOR | OFF | ON | 10 | OFF | OFF | OFF | OFF |
| BOOKBINDING PRINTING - SADDLE STITCHING | D87A65FB-A4E1-4AFD-938F-4799D50F89F7 | SAME AS DOCUMENT SIZE | ON | COLOR | OFF | OFF | NA | ON | ON | OFF | OFF |
| TONER SAVING | 71CE7D38-403A-4298-8FF4-08858C0A09CD | SAME AS DOCUMENT SIZE | ON | MONOCHROME | OFF | OFF | NA | OFF | OFF | ON | ON |

1700, 1701, 1702, 1703, 1704, 1705

PRINT PROCESSING SYSTEM AND CONTROL METHOD

BACKGROUND

Field of the Disclosure

The present disclosure generally relates to print processing and, more particularly, to a print processing system for displaying a print setting of an image processing apparatus on a client apparatus, and a control method therefor.

Description of the Related Art

A V4 printer driver provided by Windows® that is under restriction on access to a registry because importance is placed on its security. The registry is a non-volatile data area in an operating system (OS) that manages setting information of a printer driver. Because of the restriction on access to the registry, installation of a desktop application that can access a resource such as the registry is restricted. The desktop application refers to an application installed by using an installer provided by an application vendor, and the desktop application includes drivers unique to various printing apparatuses.

On the other hand, there is a case where only a store application that is under restriction on access to the registry can be installed in a client computer having the V4 printer driver. The store application (i.e., Windows Store Application) refers to an application that can be installed from a dedicated website called "Windows Store".

The V4 printer driver can also provide a class driver that supports a plurality of printing apparatuses using a single printer driver. The class driver implements an output to a printing apparatus provided by a vendor using a standard printing command employed in various types of printing apparatuses. More specifically, a print function implemented by the class driver is limited to a standard function of the printing apparatus, and not all of the print functions provided by the printing apparatus can be implemented thereby. By supplying such class driver to the OS in advance, it is possible to request the printing apparatus to execute printing using a standard print function even by using the V4 printer driver that is under restriction on installation of printer drivers unique to various printing apparatuses.

US publication application US2015/0277827 discusses an information processing use management system that determines whether an image processing apparatus can use a class driver.

With respect to an OS such as Windows 10, which places importance on security, only a standard function of a printing apparatus can be used even if a class driver is installed in the OS in advance.

SUMMARY

According to one or more aspects of the present disclosure, a print processing system includes an image processing apparatus configured to execute print processing, and a client apparatus that includes a class driver configured to convert data as a target of the print processing into print data and to transmit a printing command for causing the image processing apparatus to execute the print processing by using a standard function to the image processing apparatus together with the print data, wherein the client apparatus includes an acquisition unit configured to acquire print setting information that specifies a print setting included in the image processing apparatus from the image processing apparatus via the class driver, a display unit configured to display a print setting screen based on the print setting information acquired by the acquisition unit, and a transmission unit configured to transmit the print setting information about a print setting selected by a user on the print setting screen displayed by the display unit to the image processing apparatus via the class driver, wherein the image processing apparatus includes an execution unit configured to execute the print processing based on the print setting information transmitted by the transmission unit.

Further features of the present disclosure will become apparent from the following description of exemplary embodiments with reference to the attached drawings.

BRIEF DESCRIPTION OF THE DRAWINGS

FIG. 2 is a block diagram illustrating a software configuration of a print processing system in a client computer 100.

FIG. 8, which includes FIGS. 8A and 8B, is a flowchart illustrating display processing of a print setting UI for a desktop application according to a third exemplary embodiment.

FIG. 10, which includes FIGS. 10A and 10B, is a flowchart illustrating display processing of a UI for a printing start-up application according to a fifth exemplary embodiment.

FIGS. 15A, 15B, 15C, and 15D are diagrams each illustrating an example of a preset registration screen.

FIGS. 16A and 16B are diagrams each illustrating an example of PrintCapabilities and a print ticket.

FIG. 17 is a table illustrating an example of preset list information according to the present exemplary embodiment.

DESCRIPTION OF THE EMBODIMENTS

Hereinafter, various exemplary embodiments, features, and aspects of the present disclosure will be described in detail with reference to the appended drawings.

Figure 1A:
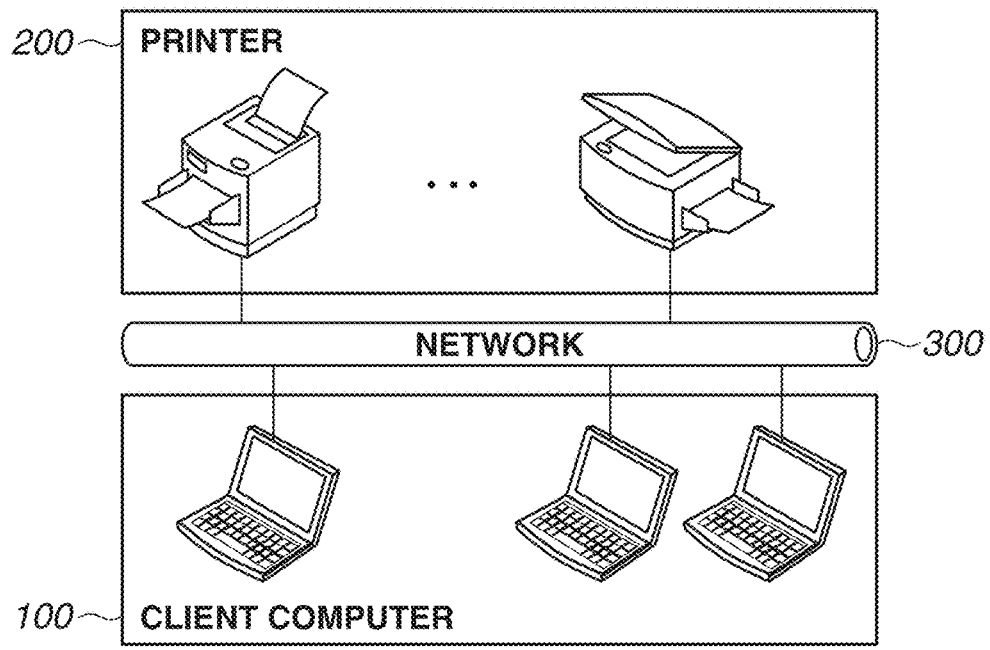
FIGS. 1A and 1B are block diagrams each illustrating a network configuration according to a present exemplary embodiment.
Figure 1B:
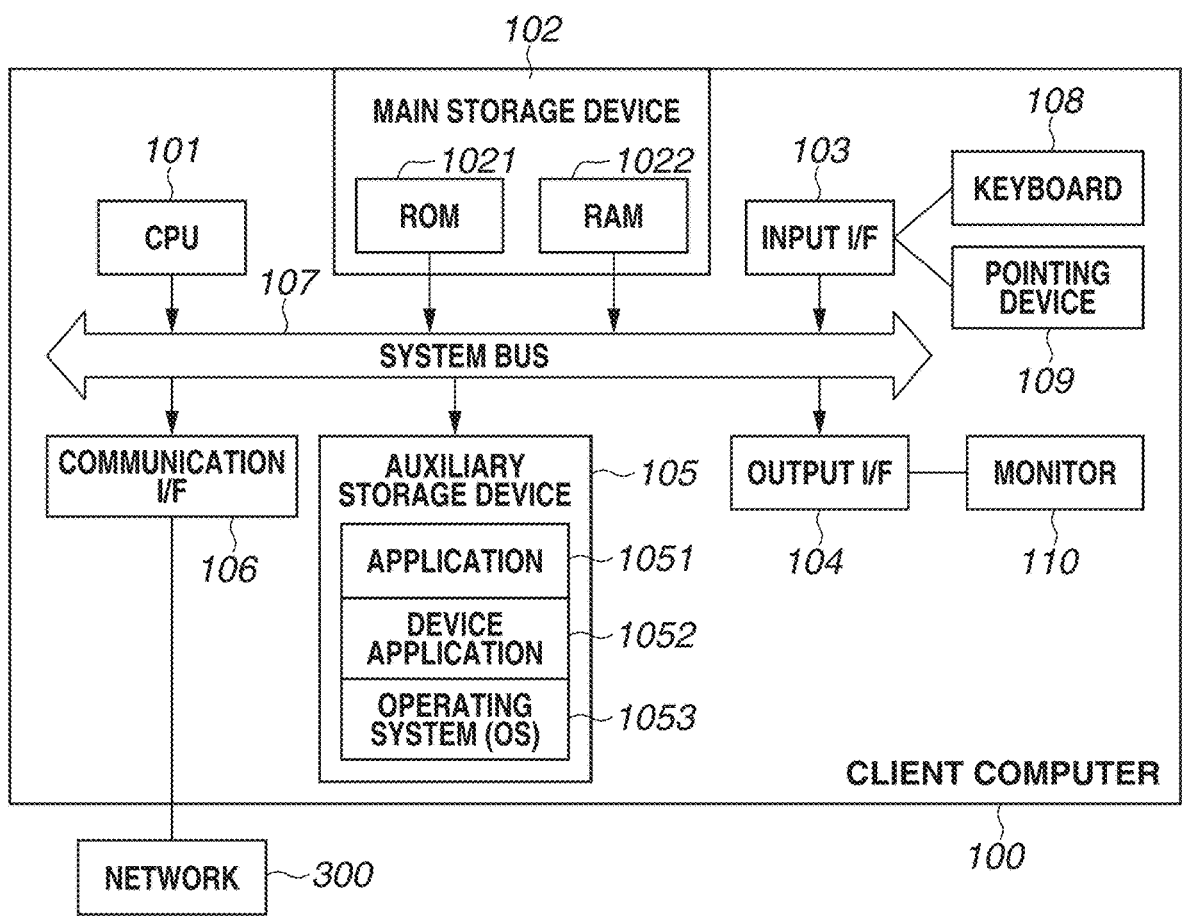

FIGS. 1A and 1B are block diagrams each illustrating a network configuration of a print processing system according to a first exemplary embodiment of the present invention. The print processing system includes a client computer 100 and a printer 200 that receives print data in a page-description language (PDL) format and executes printing of the data. The printer 200 supports a print data format supported by a standard print function of an operating system (OS) and a data transmission protocol.

Various devices that constitute the print processing system are communicably connected with each other via a network 300 represented by a local area network (LAN). The printer 200 may be a single-function printer (SFP) having only a print function or may be a multi-function printer (MFP) having a print function, a scanning function, and a copying function. The function provided to the printer 200 is not limited.

FIG. 1A is a block diagram illustrating a hardware configuration of the client computer 100 according to the present exemplary embodiment of the present invention. A central processing unit (CPU) 101, which may include one or more processors, one or more memories, circuitry, or a combination thereof, may execute control of the entire client computer 100 based on a program stored in a read only memory (ROM) 1021, a random access memory (RAM) 1022, or an auxiliary storage device 105. The RAM 1022 is also used as a work area by the CPU 101 to execute various kinds of processing. The auxiliary storage device 105 stores an application 1051, a device application 1052, and an OS 1053. The application 1051 or the device application 1052 can be added to the auxiliary storage device 105 via a compact disc read only memory (CD-ROM) (not illustrated), a universal serial bus (USB) memory (not illustrated), or the network 300. The device application 1052 refers to an application such as the Windows Store Device App (WSDA), which is dedicated to supporting a function of the V4 printer driver. If the V4 printer driver is installed, the WSDA associated with the store application is automatically installed.

An input device such as a keyboard 108 and a pointing device 109 represented by a mouse and a touch panel is a device that is used by a user to provide various instructions to the computer via an input interface (I/F) 103. An output I/F 104 is an interface for outputting data to an external device, i.e., to an output device such as a monitor 110. The client computer 100 and the printer 200 are connected with each other via the network 300 through a communication I/F 106. A system bus 107 is a common data system bus used for exchanging data between hardware modules that constitute the client computer 100.

FIG. 2 is a block diagram illustrating a software configuration of the printer 200. An OS of the printer 200 has functions such as an OS standard print function 10531, a print manager 218, a standard printing communication unit 219, an OS standard UI management unit 10532, an printing start-up application launcher 10533. The OS standard print function 10531 is a function that temporarily retains print data in an Extensible Markup Language (XML) paper specification (XPS) format spool data until print processing can be executed, and executes printing.

A graphics device interface (GDI)-to-XPS conversion module 207 is a function that converts data rendered through the GDI into XPS spool data retained by the OS standard print function 10531. The GDI is a graphics component of the printer 200 that generates a print image.

The OS standard print function 10531 is a function that converts the XPS spool data created in response to a print instruction from an application into PDL data and outputs the converted data to the printer 200. In the present exemplary embodiment, while PDL is taken as an example of the standard page description language, a type of format is not limited thereto. The format may also be a portable document format (PDF) or a raster format defined by the Printer Working Group (PWG), i.e., PWG-Raster, that are employed in a standard specification of mobile printing known as Mopria®.

The standard printing communication unit 219 can control communication executed by the print manager 218 that accesses the printer 200 and by the OS standard print function 10531, and the OS standard print function 10531 executes print processing via the standard printing communication unit 219. Further, the print manager 218 communicates with the printer 200 via the standard printing communication unit 219 to acquire information about a corresponding function and a setting value. The standard printing communication unit 219 communicates with the printer 200 using a standard communication protocol such as an internet printing protocol (IPP). By using the standard communication protocol, the standard printing communication unit 219 can communicate with multiple printers of different types.

A desktop application 201 and a UWP application 202 are stored as the applications 1051 in the auxiliary storage device 105. The UWP application 202 refers to an application operating on a universal Windows platform (UWP) introduced to Windows 10, and it improves an operation environment in comparison to that of the store application. In the below-described exemplary embodiment, the UWP application 202 will be described as an example. However, the exemplary embodiment can also be implemented by replacing the UWP application 202 with the store application.

The user uses an input device such as the keyboard 108 and the pointing device 109 represented by a touch panel and a mouse to execute print processing from the desktop application 201 or the UWP application 202 displayed on the monitor 110 of an output device.

<Print Processing>

Herein, print processing will be described with reference to FIG. 2. The print processing is executed mainly by sequentially executing three types of processing, i.e., selection of a printer, creation of a print setting, and conversion of rendering data.

First, the user selects the printer 200 for which print processing is executed. In the selection processing, the OS standard print function 10531 corresponding to the printer 200 is selected. A print queue is used for selecting the printer 200 (OS standard print function 10531). Before executing printing, the user generates the print queue, which is a unit for managing device information of the printer 200 and a predetermined print setting. The user selects the generated print queue to select the OS standard print function 10531 associated with the print queue.

The application 1051 includes the desktop application 201 and the UWP application 202, and secures a memory area for print setting data in the RAM 1022. The application 1051 acquires PrintCapabilities 250 from a standard print setting management unit 208, and creates print setting data based on the acquired PrintCapabilities 250. The created print setting data is stored in the RAM 1022. The PrintCapabilities 250 is data in which a list of print functions and items to be selected that are settable by the OS standard print function 10531 is described in the XML format based on a format defined by the OS. The PrintCapabilities 250 is generated by the standard print setting management unit 208.

The OS standard UI management unit 10532 and the device application 1052 provide a print setting UI based on the PrintCapabilities 250. The desktop application 201 uses a binary DEVMODE 203 as print setting data, and the UWP application 202 uses a print ticket 204 described in the XML mark-up language. The DEVMODE 203 is a structure provided by the OS, and stores a file of print setting data in a format usable for the desktop application 201 to execute printing. The print setting data includes a function corresponding to the OS standard print function 10531, and the standard print setting management unit 208 uses a standard print function definition file 209 that defines the corresponding function to create the print setting data.

The print setting data is set by the standard print setting management unit 208 or an expansion printing setting unit 10522 serving as a UWP application print setting UI provided by the device application 1052. Based on the contents set by the expansion printing setting unit 10522, the OS standard print function 10531 changes the setting corresponding to the DEVMODE 203 or the print ticket 204. With respect to the print ticket 204, because the print setting is described in the XML format, all of the setting values can be directly rewritten by the UWP application 202. However, the setting values may be rewritten using the expansion printing setting unit 10522 serving as a UI for the device application 1052.

After the print setting is determined, the user executes print processing using the application 1051. In a case where the print processing is executed using the desktop application 201, rendering data is transmitted to the GDI-to-XPS conversion module 207, and an XPS spool file 206 is created therefrom. At this time, the GDI-to-XPS conversion module 207 converts the print setting acquired from the standard print setting management unit 208, from the DEVMODE 203 into the print ticket 204.

On the other hand, in a case where the print processing is executed using the UWP application 202, the UWP application 202 generates the XPS spool file 206, or the OS 1053 (see FIG. 1B) generates the XPS spool file 206 in response to a rendering instruction from the UWP application 202. In any of the above cases, the XPS spool file 206 is generated in the middle of the print processing.

After the XPS spool file 206 is generated in response to the print instruction from the desktop application 201 or the UWP application 202, a standard print processing unit 212 executes rendering on the XPS spool file 206 and converts the XPS spool file 206 into PDL data. The PDL data is managed by the print manager 218 that executes schedule management of the print processing, and print jobs are sequentially registered in a queue (waiting line). If the printer 200 is brought into a state where printing is executable, print jobs are transmitted to the printer 200 via the standard printing communication unit 219 in the order the print jobs are registered in the queue.

The standard print processing unit 212 transmits the setting contents specified by the print ticket 204 included in the XPS spool file 206 to the standard printing communication unit 219. The standard printing communication unit 219 transmits the received setting contents to the printer 200 using a standard communication protocol, and print setting information retained by the standard print setting management unit 208 or the device application 1052 is reflected on the print processing. This print setting information is information selected by a user operation performed through the print setting UI.

The device application 1052 is an application for expanding the function of the printer 200, and includes the expansion printing setting unit 10522, a printing start-up application unit 10521, a tile application unit 10523, and a device application communication unit 10524. The printing start-up application unit 10521 has a function for displaying a print preview on the UI and a function for editing the XPS spool file 206 if the printing start-up application unit 10521 is called by the printing start-up application launcher 10533 when the printing is to be executed, so that expansion of the print processing functions of the printer 200 can be achieved thereby.

The tile application unit 10523 is a function of an application activated from a list of applications such as a start menu of the OS separately from the print processing, which is a function for guiding a user to a management screen of the printer 200 or a web site for the support information of the printer 200.

The device application communication unit 10524 is a function enabling each of module of the device application 1052 to communicate with the printer 200. Operations of each of the respective modules at the time of executing the print processing have been described as the above.

<Hardware Configuration of Printer 200>

Figure 3:
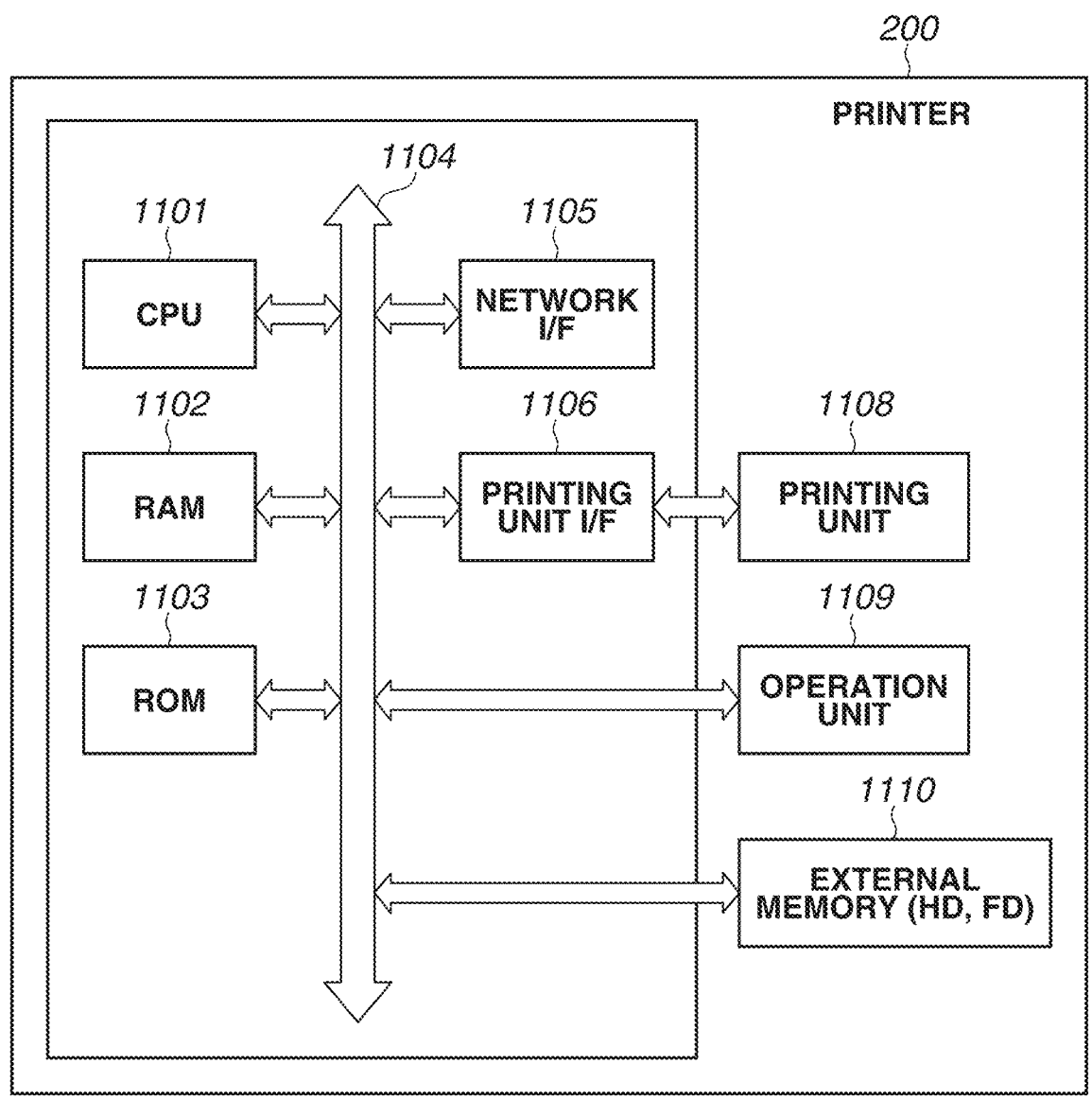
FIG. 3 is a block diagram illustrating a hardware configuration of a printer 200.

FIG. 3 is a block diagram illustrating a hardware configuration of the printer 200. A CPU 1101 outputs an image signal as output information to a printing unit (printer engine) 1108 via a printing unit I/F 1106 connected to a system bus 1104 based on a control program stored in a ROM 1103 or an external memory 1110.

A network I/F 1105 executes network communication through the WiFi or the Ethernet®). The CPU 1101 can execute communication processing with the client computer 100 via the network I/F 1105, and information about the printer 200 can be transmitted to the client computer 100. A RAM 1102 functions as a main memory and a work area of the CPU 1101, and a memory capacity thereof can be expanded by an optional RAM connected to an expansion port (not illustrated). An operation unit 1109 is an operation panel on which a switch and a light-emitting diode (LED) display unit for executing operation are arranged. The external memory 1110 stores information about various setting values managed by the printer 200 that is set through the operation unit 1109.

<Software Configuration of Printer 200>

Figure 4:
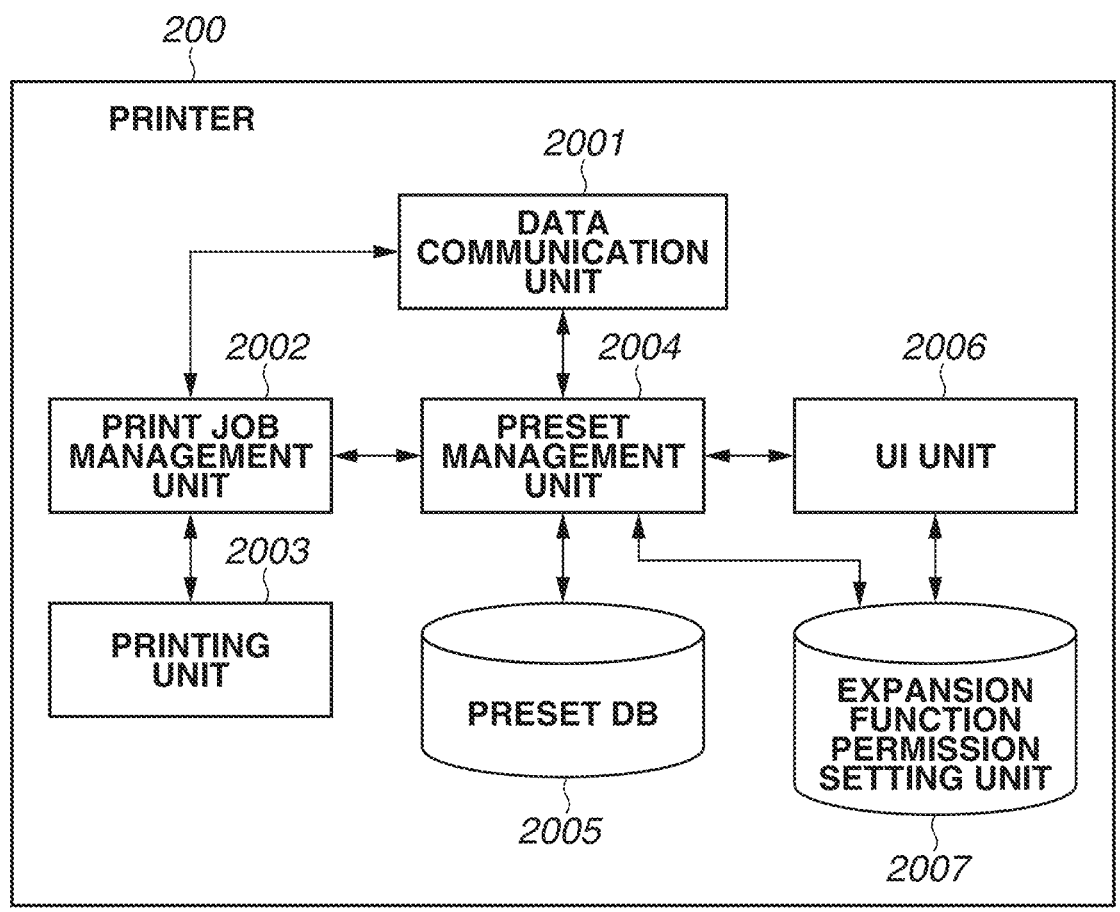
FIG. 4 is a block diagram illustrating a software configuration of the printer 200.

FIG. 4 is a block diagram illustrating functions provided by the printer 200. A data communication unit 2001 receives a print job and various requests from the client computer 100, executes predetermined processing thereon, and transmits a response to the client computer 100. A print job management unit 2002 temporarily stores a print job received by the data communication unit 2001 in the external memory 1110, and sequentially transmits an instruction for executing print processing via the printing unit 2003. According to the instruction from the print job management unit 2002, the printing unit 2003 executes print processing corresponding to the setting contents of the print job. A preset management unit 2004 manages preset list information, which is a combination of a plurality of pieces of print setting information called "preset" stored in a preset database (DB) 2005.

FIG. 17 is a table illustrating an example of preset list information 1700. The preset list information 1700 includes a preset name 1701, a preset ID 1702, print setting information 1703, and a start-up setting 1705 of the printing start-up application. The start-up setting 1705 of the printing start-up application serves as a flag indicating whether to start the printing start-up application unit 10521 when printing is executed.

A preset ID 1702 is identification information for uniquely identifying the preset. The print setting information 1703 includes print setting information, which is an expansion function of the printer 200 not supported by the OS standard print function 10531. The preset list information 1700 illustrated in FIG. 17 includes items such as "two-sided printing", "color mode", "stapling", "box printing", "bookbinding printing", "saddle stitching", and "toner save".

Figure 18:
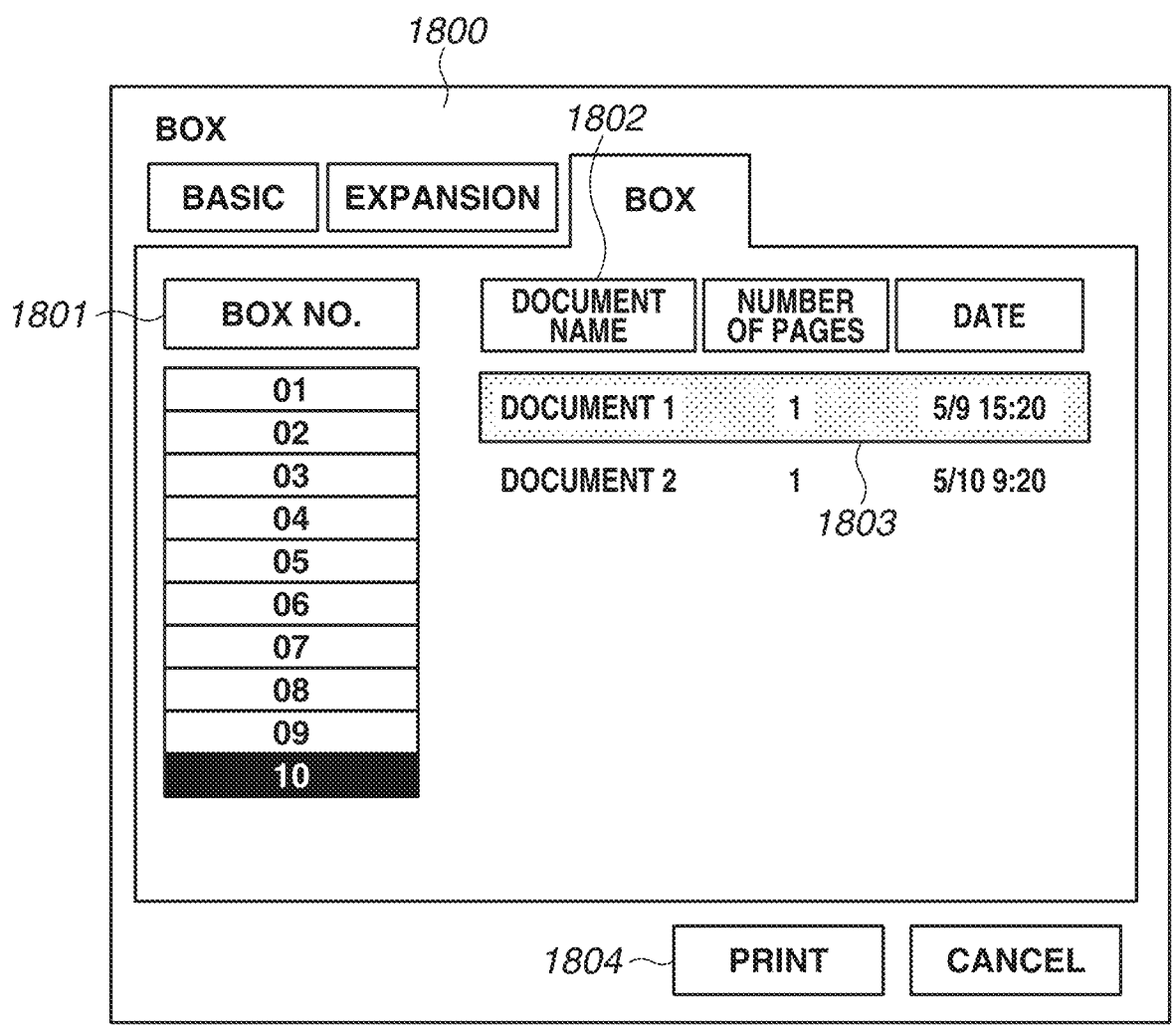
FIG. 18 is a diagram illustrating an example of a box printing screen.

For example, a preset name "box printing—No. 10" and a preset ID "4CF97CE2-8F47-49FE-BFE5-A021EAD1AF8D" are allocated to a preset 1704. Further, two-sided printing "ON" and box printing "ON" are specified in the print settings of the preset 1704. When the preset 1704 is specified, a print job received by the data communication unit 2001 is not executed instantly and is saved in an area of the external memory 1110 called a "box". A save area of the box is managed by a box number, and a box number 10 is specified for the preset 1704. A print job saved in the box is displayed on a screen 1800 illustrated in FIG. 18 via the operation unit 1109 of the printer 200. The screen 1800 includes a box number area 1801, a list of documents 1802 stored in the box selected from the box number area 1801, and a print button 1804. On the screen 1800, a user selects "10" from the box number area 1801 as the box number specified when printing is executed. If the box number is selected, the list of documents 1802 saved in the selected box number is displayed. The user presses a print button 1804 in a state where the document 1803 is selected, and the document 1803 is printed via the printing unit 1108.

Referring back to FIG. 4. An expansion function permission setting 2007 retains a setting about whether a manager permits use of an expansion function of the printer 200. A UI unit 2006 provides a UI for changing a setting of the expansion function permission setting 2007 or a setting of the preset DB 2005. The functions included in the printer 200 have been described as the above.

<Preset Registration Processing>

Preset registration processing managed by the preset DB 2005 of the printer 200 will be described. In the present exemplary embodiment, a case is described where registration is executed via the UI provided by the tile application unit 10523 included in the device application 1052. A method for executing registration is not limited thereto, and any method can be employed as long as the preset is registered in the printer 200 in advance. For example, the preset may be registered via the UI provided by the UI unit 2006 of the printer 200.

Figure 15A:
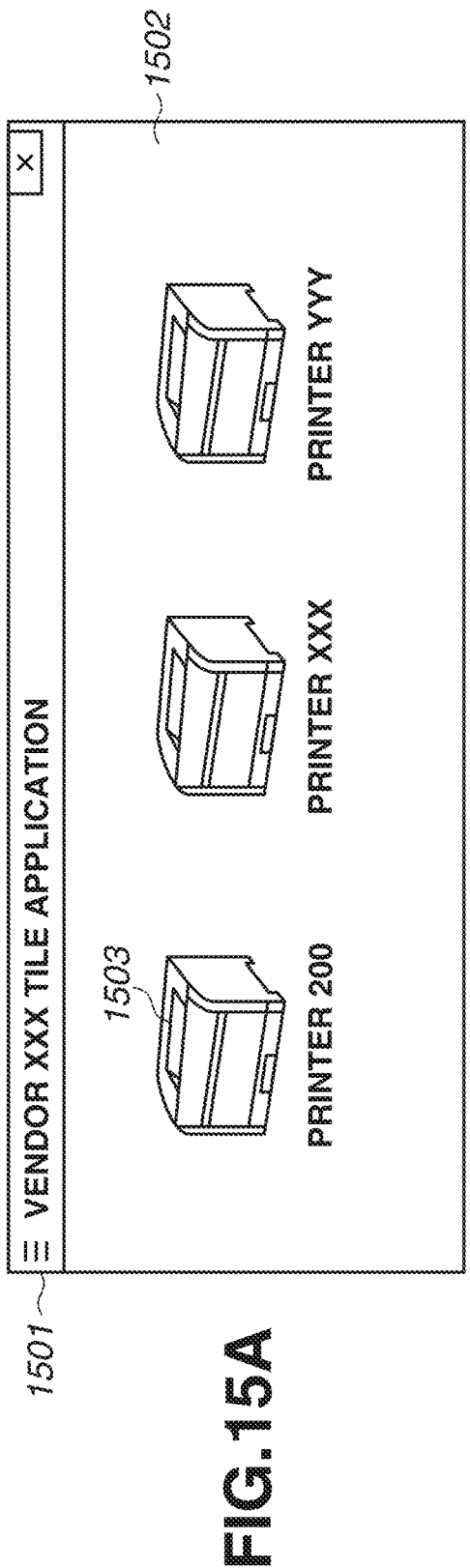
Figure 15B:
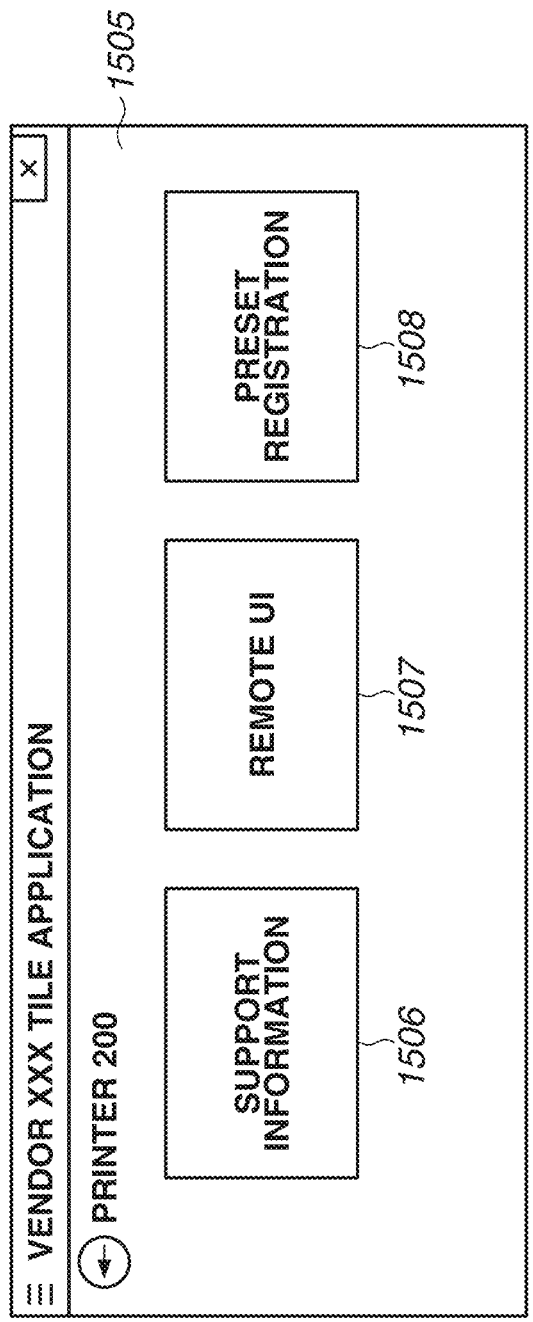

FIG. 15A is a diagram illustrating an example of a screen 1501 displayed when the tile application unit 10523 of the client computer 100 is started. A printer list 1502 including a list of printers associated with the device application 1052 is displayed on the screen 1501. If an icon 1503 associated with the printer 200 is selected, the screen 1501 transitions to a screen 1505 illustrated in FIG. 15B. FIG. 15B is a diagram illustrating a screen that displays links to various functions related to the printer 200. On the screen 1505, a support information button 1506, a remote UI button 1507, and a preset registration button 1508 are displayed. If the support information button 1506 is pressed, the screen 1505 transitions to a web site screen for the support information of the printer 200. When the remote UI button 1507 is pressed, the screen 1505 transitions to a management screen provided by the printer 200 via a web browser. If the preset registration button 1508 is pressed, the screen 1505 transitions to a screen 1520 illustrated in FIG. 15C.

The screen 1520 includes a registered preset list 1521, a preset registration button 1522, a registration preset name 1523, a preset print setting information area 1524, and a close button 1525.

A name of the preset to be registered can be specified in the registration preset name 1523. A list of names of the presets saved in the preset DB 2005 of the printer 200 is displayed on the registered preset list 1521. In the preset print setting information area 1524, print setting items including settings of the expansion functions of the printer 200 that are not supported by the OS standard print function 10531 are displayed. The user specifies a desired print setting in the preset print setting information area 1524 and presses a preset registration button 1522. When the preset registration button 1522 is pressed, the tile application unit 10523 transmits a preset registration request to the printer 200 via the device application communication unit 10524. At this time, the registration preset name 1523 and the setting value information specified in the preset print setting information area 1524 are transmitted to the printer 200. The data communication unit 2001 of the printer 200 receives the preset registration request and registers, in the preset DB 2005, the specified preset name and the print setting information together with a newly-generated unique preset ID via the preset management unit 2004. A list of presets registered in the preset DB 2005 is illustrated in FIG. 17.

Through the above-described processing, the user can register a preset reflecting the user's preferred setting in the printer 200 in advance via the client computer 100.

<Embodiment of Displaying Modern Print Dialog>

An embodiment of using an expansion function of the printer 200 under an environment using a class driver will be described. In the present exemplary embodiment, an embodiment of displaying a preset list on a setting screen (i.e., modern print dialog) provided by the OS standard UI management unit 10532 of the OS 1053 will be described as an example.

Figure 5:
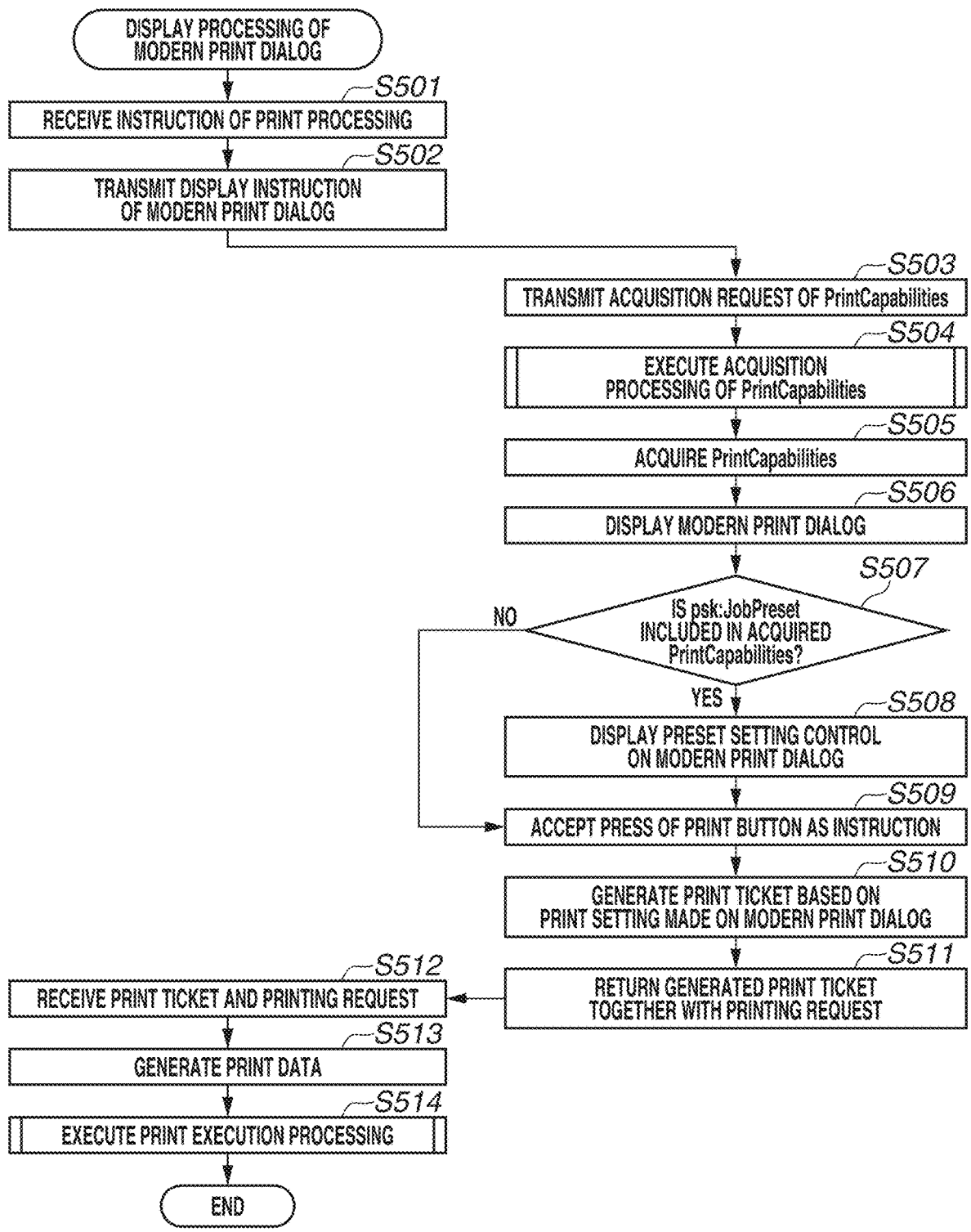
FIG. 5 is a flowchart illustrating display processing of a modern print dialog according to a first exemplary embodiment.
Figure 11A:
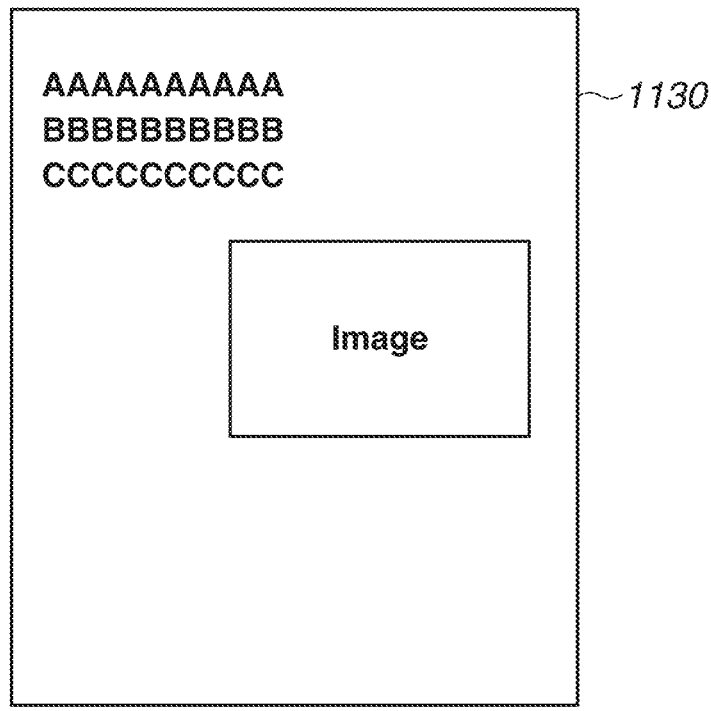
FIGS. 11A, 11B, and 11C are diagrams each illustrating an example of a print setting screen of a UWP application and a modern print dialog.

FIG. 11A is a diagram illustrating an example of a print setting screen of the UWP application 202 serving as a rendering application. FIG. 11A illustrates a document including text and a picture, which is regarded as a print processing target. With reference to a flowchart in FIG. 5, processing to be executed in a case where a print instruction is given on a screen 1130 provided by the UWP application 202 will be described. The processing described in the present exemplary embodiment is implemented by the CPU 101 loading a program stored in the auxiliary storage device 105 into the RAM 1022 in response to the user operation and executing the program.

In step S501, an instruction for displaying a modern print dialog is given on the screen 1130. In step S502, the UWP application 202 transmits a display instruction of the modern print dialog to the OS 1053. The OS 1053 receives the display instruction, and in step S503, the OS standard UI management unit 10532 requests the OS standard print function 10531 to acquire the PrintCapabilities. As a result, in step S504, the OS standard print function 10531 executes acquisition processing of the PrintCapabilities. The acquisition processing of the PrintCapabilities will be described below.

Figure 11B:
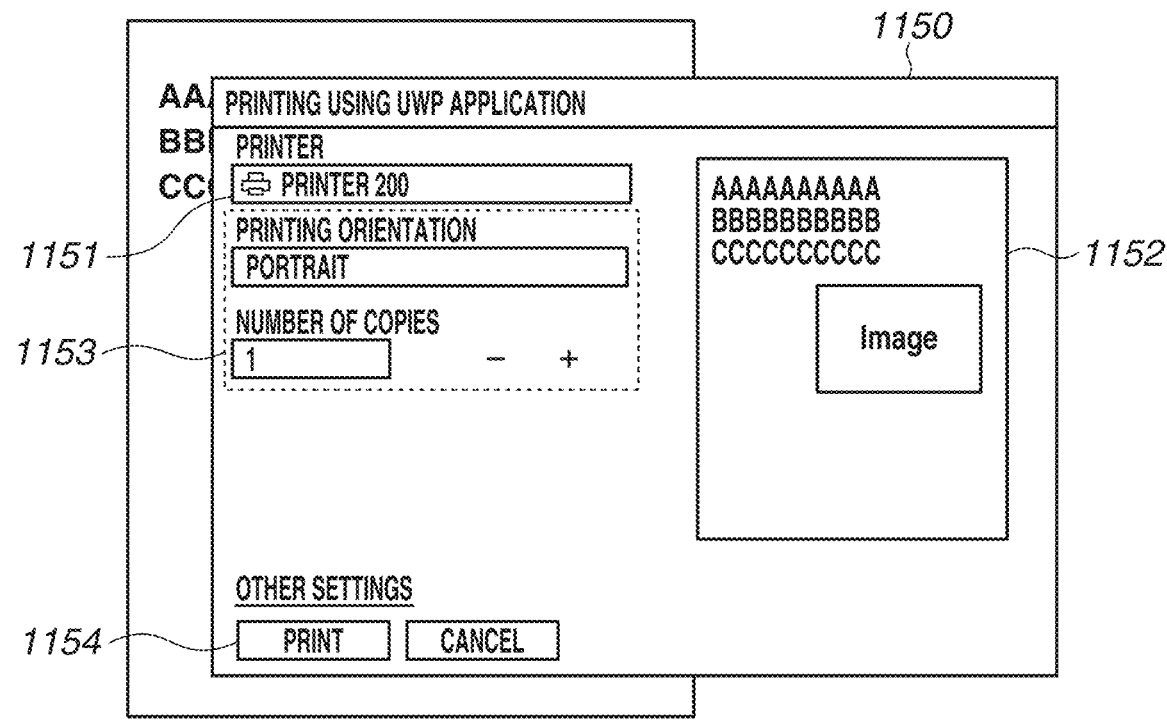
Figure 11C:
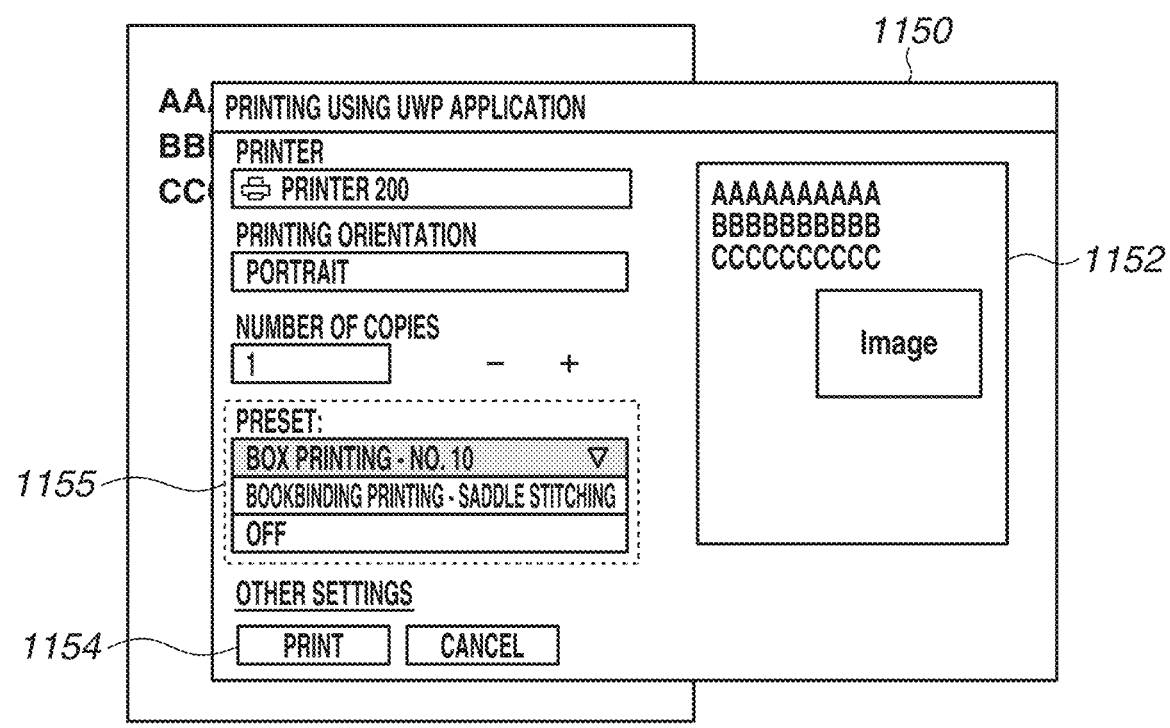

In step S505, the OS standard UI management unit 10532 acquires the PrintCapabilities from the OS standard print function 10531. In step S506, the OS standard UI management unit 10532, which has received the PrintCapabilities, displays a modern print dialog. An example of the modern print dialog 1150 is illustrated in FIG. 11B. The modern print dialog 1150 has a printer selection control 1151 that enables a user to select a printer usable by the OS 1053. In a state illustrated in FIG. 11B, the user has selected the printer 200. In addition, the modern print dialog 1150 includes a printing preview area 1152 that enables the user to check a printing result on a screen, and a print setting area 1153 that enables the user to select a print setting supported by the OS standard print function 10531.

After the modern print dialog 1150 is displayed, in step S507, the OS standard print function 10531 determines whether the psk:JobPreset (i.e., preset) is included in the PrintCapabilities acquired in step S504. An example of the PrintCapabilities is illustrated in FIGS. 16A and 16B. Characters "psk:" provided at the beginning of each definition represents a name space, and "psk:" is used to distinguish the definition of the preset from a definition of another name space. As illustrated in FIGS. 16A and 16B, since the psk:JobPreset is included in the PrintCapabilities, the processing proceeds to step S508.

If the OS standard print function 10531 determines that the psk:JobPreset is included (YES in step S507), in step S508, the OS standard UI management unit 10532 displays a preset setting control 1155 on the modern print dialog 1150. A character string of a property of the psk:PresetName of each Option included in the psk:JobPreset in the PrintCapabilities 1600 in FIG. 16A is listed in the preset setting control 1155. Thus, the user can check a list of preset names registered in the printer 200 and select a preset on the modern print dialog. On the other hand, in step S507, if the OS standard print function 10531 determines that the psk:JobPreset is not included (NO in step S507), the preset setting control 1155 is not displayed thereon, and the processing proceeds to step S509.

After the print setting including setting of the preset is determined on the modern print dialog 1150, in step S509, the OS standard UI management unit 10532 receives a press of a print button 1154 as an instruction from the user. After the print button 1154 is pressed, in step S510, the OS standard UI management unit 10532 generates a print ticket based on the print setting made in the modern print dialog 1150. FIG. 16B is a diagram illustrating an example of a print ticket 1610 generated in step S508. A printing orientation "Portrait" selected in the modern print dialog 1150 is reflected in the print ticket 1610, so that a setting value "psk:Portrait", which represents a portrait printing orientation, is set to a Feature 1611 of the print ticket 1610. Further, setting contents of the preset selected in the modern print dialog 1150 is reflected therein, so that "ns0000:Preset01" is specified in a Feature 1612 of the print ticket 1610. The setting value information of the function supported by the OS standard print function 10531 can also be included in the print ticket 1610 in addition to the setting value information illustrated in the example in FIG. 16B.

In step S511, the OS standard UI management unit 10532 returns the print ticket to the UWP application 202 together with the printing request. In step S512, the UWP application 202 acquires the printing request and the print ticket from the OS standard UI management unit 10532. Then, in step S513, the UWP application 202 generates print data. The print data is described in an XPS format, and the print data includes a print ticket including the print setting information and rendering data generated by the rendering application.

In step S514, after the print data is generated, the UWP application 202 instructs the OS standard print function 10531 to execute printing. Print execution processing in step S514 will be described below. The display processing of the modern print dialog has been described as the above.

<Acquisition Processing of PrintCapabilities>

Figure 6A:
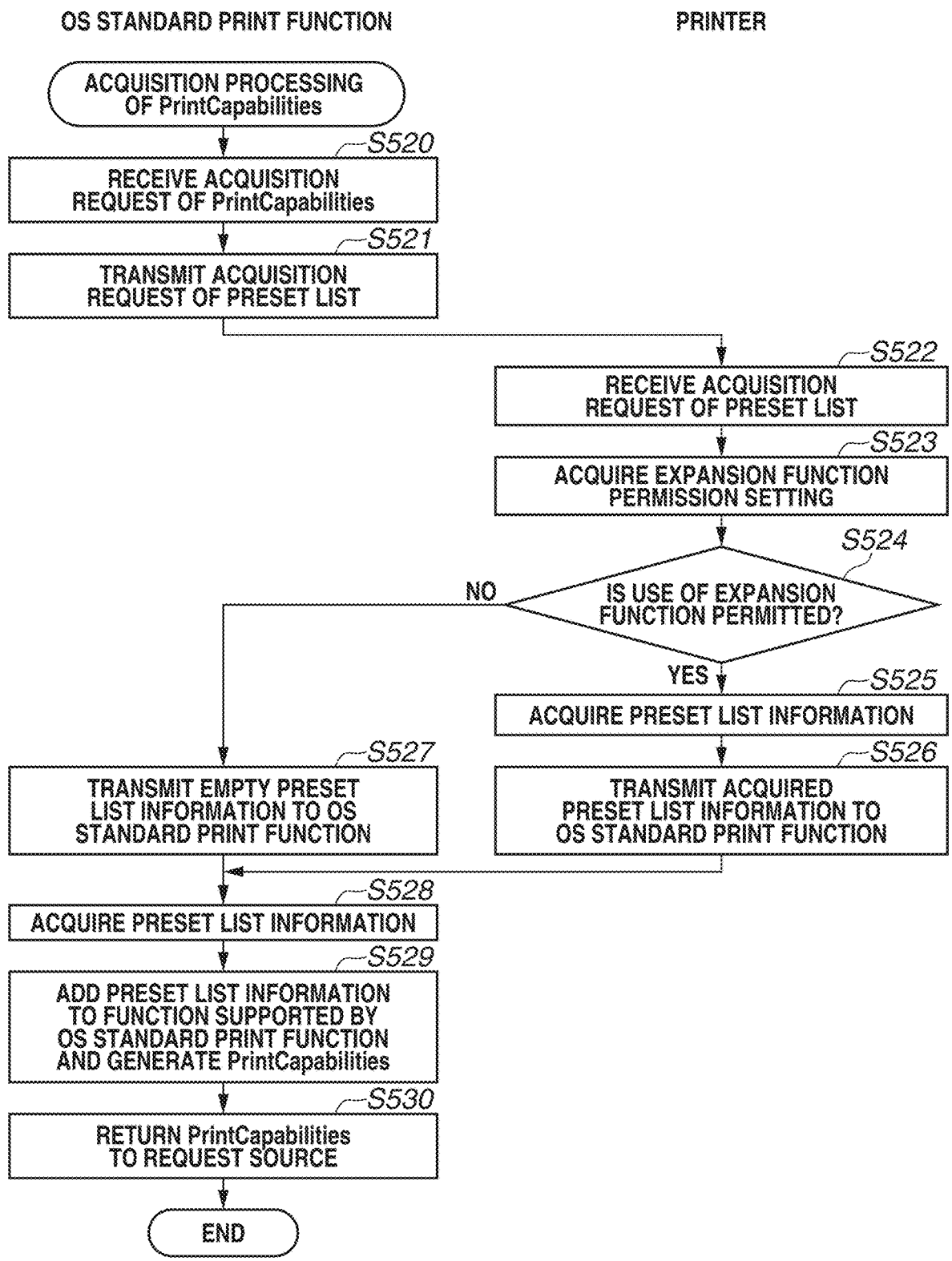
FIG. 6A is a flowchart illustrating acquisition processing of PrintCapabilities.

With reference to FIG. 6A, acquisition processing for acquiring the PrintCapabilities from the printer 200, executed by the OS standard print function 10531, will be described. The processing relating to the printer 200 described in the present exemplary embodiment will be implemented by the CPU 1101 loading a program recorded in the external memory 1110 into the RAM 1102 and executing the program.

First, in step S520, the standard print setting management unit 208 of the OS standard print function 10531 receives an acquisition request of the PrintCapabilities. In step S521, the standard print setting management unit 208 transmits an acquisition request of a preset list to the printer 200 via the standard printing communication unit 219.

In step S522, the data communication unit 2001 of the printer 200 receives the acquisition request of the preset list. In step S523, after the acquisition request of the preset list is received, the preset management unit 2004 acquires the expansion function permission setting 2007 (see FIG. 17). In step S524, based on the setting value of the expansion function permission setting 2007, the preset management unit 2004 determines whether use of the expansion function is permitted. If the preset management unit 2004 determines that the use of the expansion function is permitted (YES in step S524), the processing proceeds to step S525. In step S525, the preset management unit 2004 acquires the preset list information 1700 stored in the preset DB 2005. In step S526, the preset management unit 2004 returns the acquired preset list information 1700 to the OS standard print function 10531 via the data communication unit 2001. On the other hand, if the preset management unit 2004 determines that the use of the expansion function is not permitted (NO in step S524), the processing proceeds to step S527. In step S527, the preset management unit 2004 returns the preset list information 1700 to the OS standard print function 10531 in an empty state.

In step S528, the standard print setting management unit 208 of the OS standard print function 10531 acquires the preset list information 1700. In step S529, the standard print setting management unit 208 adds the preset list information 1700 acquired in step S528 to the function supported by the OS standard print function 10531, and generates the PrintCapabilities. FIG. 16A is a diagram illustrating an example of the PrintCapabilities generated in step S529. In the PrintCapabilities 1600, functions supported by the OS standard print function 10531 and a list of settable items of the respective functions are defined in the XML format. In a Feature 1601, definitions of the printing orientation settings supported by the OS standard print function 10531 are described, and "psk:Portrait" and "psk:Landscape" are defined as setting items. The setting value information of the functions supported by the OS standard print function 10531 can also be included in the PrintCapabilities 1600 in addition to the setting value information illustrated in FIG. 16A.

A Feature 1602 (psk:JobPreset) as a definition of a list of presets registered in the preset DB 2005 of the printer 200 is included in the PrintCapabilities 1600. Further, a setting value "psk:None" (Option 1603) for not using the setting of the preset and a set preset "ns0001:Preset01" (Option 1604) are included in the Feature 1602. The Option 1604 corresponds to the preset 1704 in FIG. 17, and a preset name "BOX PRINTING, NO. 10" of the preset 1704 is stored in a preset name "psk:PresetName". Further, a preset ID "4CF97CE2-8F47-49FE-BFE5-A021EAD1AF8D" of the preset 1704 is stored in a preset ID "psk:PresetID".

If the printer 200 returns the preset list in an empty state in step S527, the psk:JobPreset is not included in the PrintCapabilities 1600. As a result, the user cannot use the preset.

After the PrintCapabilities is generated in step S529, in step S530, the standard print setting management unit 208 returns the PrintCapabilities to the client computer 100, which is a request source. The acquisition processing for acquiring the PrintCapabilities from the printer 200 has been described as the above.

<Print Execution Processing of OS Standard Print Function>

Figure 6B:
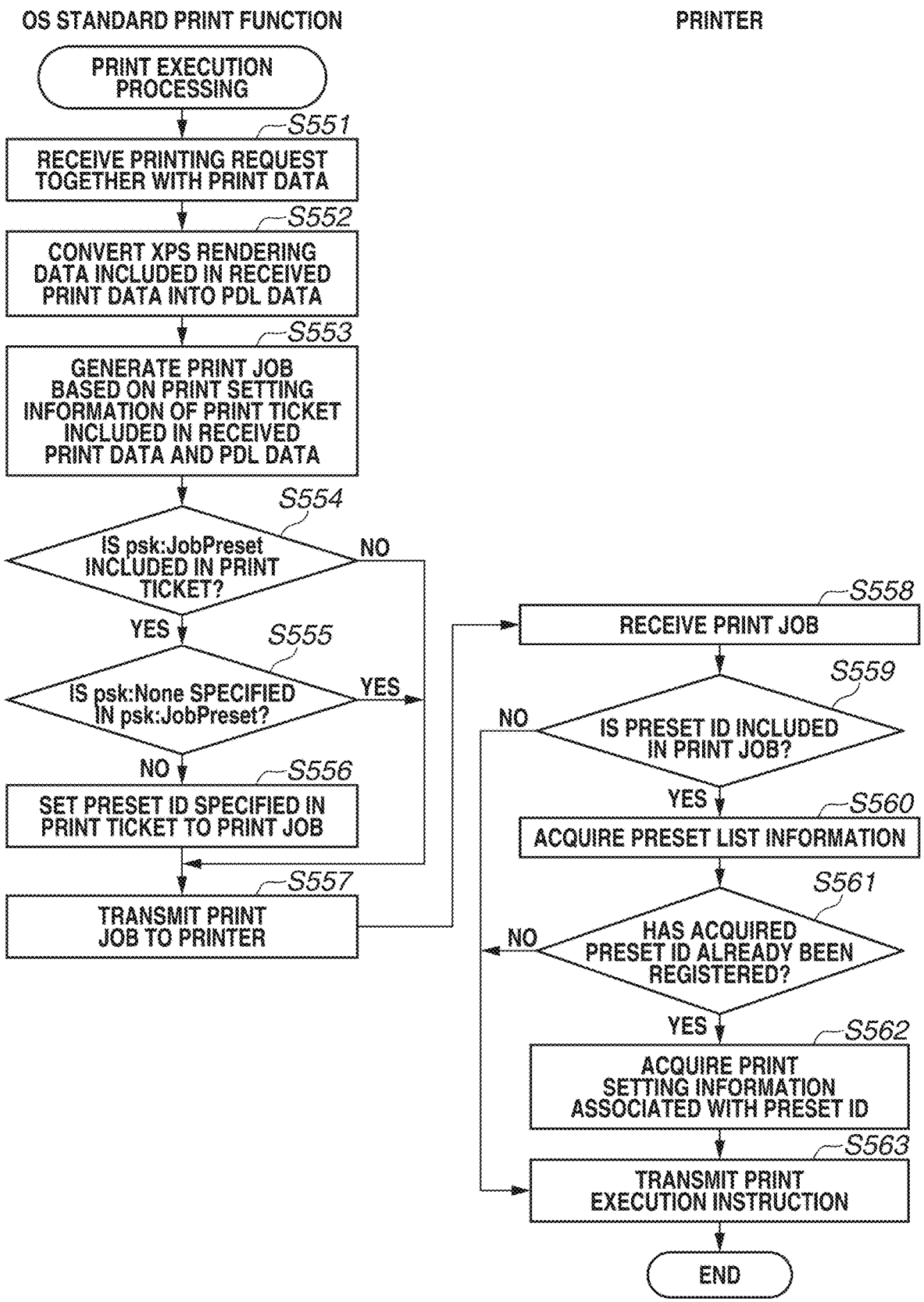
FIG. 6B is a flowchart illustrating print execution processing.

With reference to the flowchart in FIG. 6B, print execution processing in the printer 200 will be described. This processing flow is executed after the print setting UI is displayed based on the PrintCapabilities acquired by the OS standard print function 10531 through the processing in FIG. 6A and the OS standard print function 10531 receives the printing request due to the user operation executed on the print setting UI.

In step S551, the standard print processing unit 212 of the OS standard print function 10531 receives a printing request from the UWP application 202 together with print data. In step S552, the standard print processing unit 212 converts XPS rendering data included in the received print data into PDL data. In step S553, the standard print processing unit 212 generates a print job based on the print setting information of the print ticket included in the print data and the PDL data generated in step S552.

In step S554, the standard print processing unit 212 determines whether the psk:JobPreset is included in the print ticket. If the standard print processing unit 212 determines that the psk:JobPreset is included in the print ticket (YES in step S554), the processing proceeds to step S555. In step S555, the standard print processing unit 212 determines whether the psk:None is specified in the psk:JobPreset. If the standard print processing unit 212 determines that the psk:None is not specified (NO in step S555), the processing proceeds to step S556. In step S556, the standard print processing unit 212 sets a preset ID, which is specified in the print ticket, to the print job. In the present exemplary embodiment, a case is cited where the preset ID "4CF97CE2-8F47-49FE-BFE5-A021EAD1AF8D" included in the Feature 1612 of the print ticket in FIG. 16B is specified.

In step S557, the standard print processing unit 212 transmits the print job to the printer 200 via the standard printing communication unit 219.

If the standard print processing unit 212 determines that the psk:JobPreset is not included in the print ticket (NO in step S554) or determines that the psk:None is specified in the psk:JobPreset (YES in step S555), the preset ID is not set to the print job, and the processing proceeds to step S557.

In step S558, the data communication unit 2001 of the printer 200 receives the print job. In step S559, the print job management unit 2002 determines whether the preset ID is included in the print job. If the print job management unit 2002 determines that the preset ID is included (YES in step S559), the processing proceeds to step S560. In step S560, the print job management unit 2002 acquires the preset list information 1700 registered in the preset DB 2005 via the preset management unit 2004. In step S561, the print job management unit 2002 determines whether the acquired preset ID has already been registered in the preset list information 1700. If the print job management unit 2002 determines that the acquired preset ID has already been registered (YES in step S561), the processing proceeds to step S562. In step S562, the print job management unit 2002 acquires print setting information 1703 associated with the acquired preset ID by using the preset list information 1700. In step S563, the print job management unit 2002 instructs the printing unit 2003 to execute printing based on the print setting information.

If the print job management unit 2002 determines that the preset ID is not included in the print job (NO in step S559) or determines that the acquired preset ID has not been registered in the preset list information 1700 (NO in step S561), the processing proceeds to step S563. In step S563, the print job management unit 2002 instructs the printing unit 2003 to execute printing without reflecting the setting contents of the preset. The print execution processing has been described as the above.

Through the above-described processing, the user can execute print processing on the printer 200 using the expansion function not supported by the OS standard print function 10531 by specifying the preset displayed on the modern print dialog.

In a second exemplary embodiment, another embodiment of displaying a preset list by using a UWP application print setting UI will be described as an example.

Figure 12A:
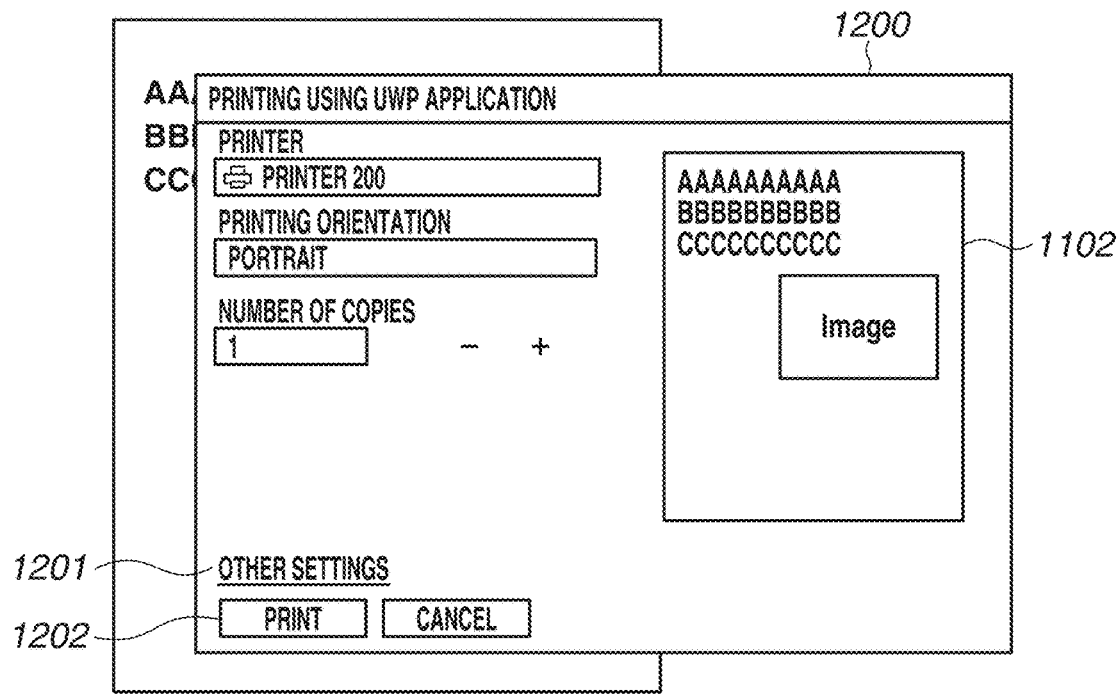
FIGS. 12A, 12B, and 12C are diagrams each illustrating an example of a print setting screen of the UWP application provided by an operating system (OS) or a vendor.

FIG. 12A is a diagram illustrating an example of a print setting screen of a modern print dialog 1200 displayed by the UWP application 202 serving as a rendering application. Up to this point, a configuration thereof is similar to that of the print setting screen in FIG. 11B described in the first exemplary embodiment. The modern print dialog 1200 includes an OTHER-SETTINGS button 1201 for displaying the UWP application print setting UI. If the OTHER-SETTINGS button 1201 is pressed, a UI (FIG. 12B) provided by the OS standard UI management unit 10532 or a UI (FIG. 12C) provided by the expansion printing setting unit 10522 is displayed. In the present exemplary embodiment, a preset setting control 1211 (1221) is displayed on the screen illustrated in FIG. 12B or 12C.

Figure 7:
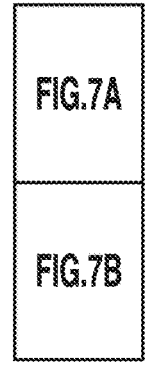
FIG. 7, which includes
Figure 7A:
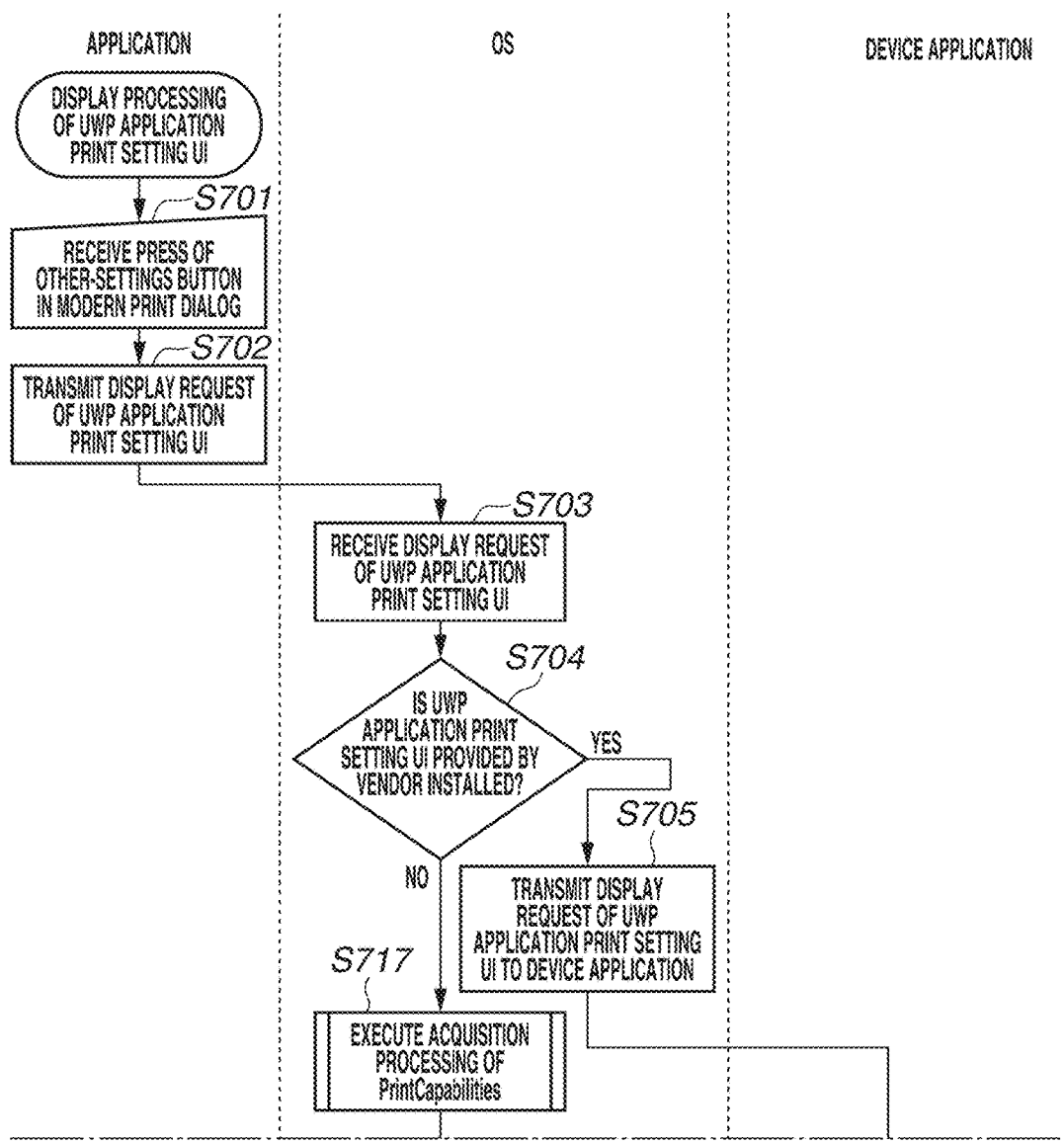
FIGS. 7A and 7B, is a flowchart illustrating display processing of a print setting user interface (UI) for a universal Windows platform (UWP) application according to a second exemplary embodiment.
Figure 7B:
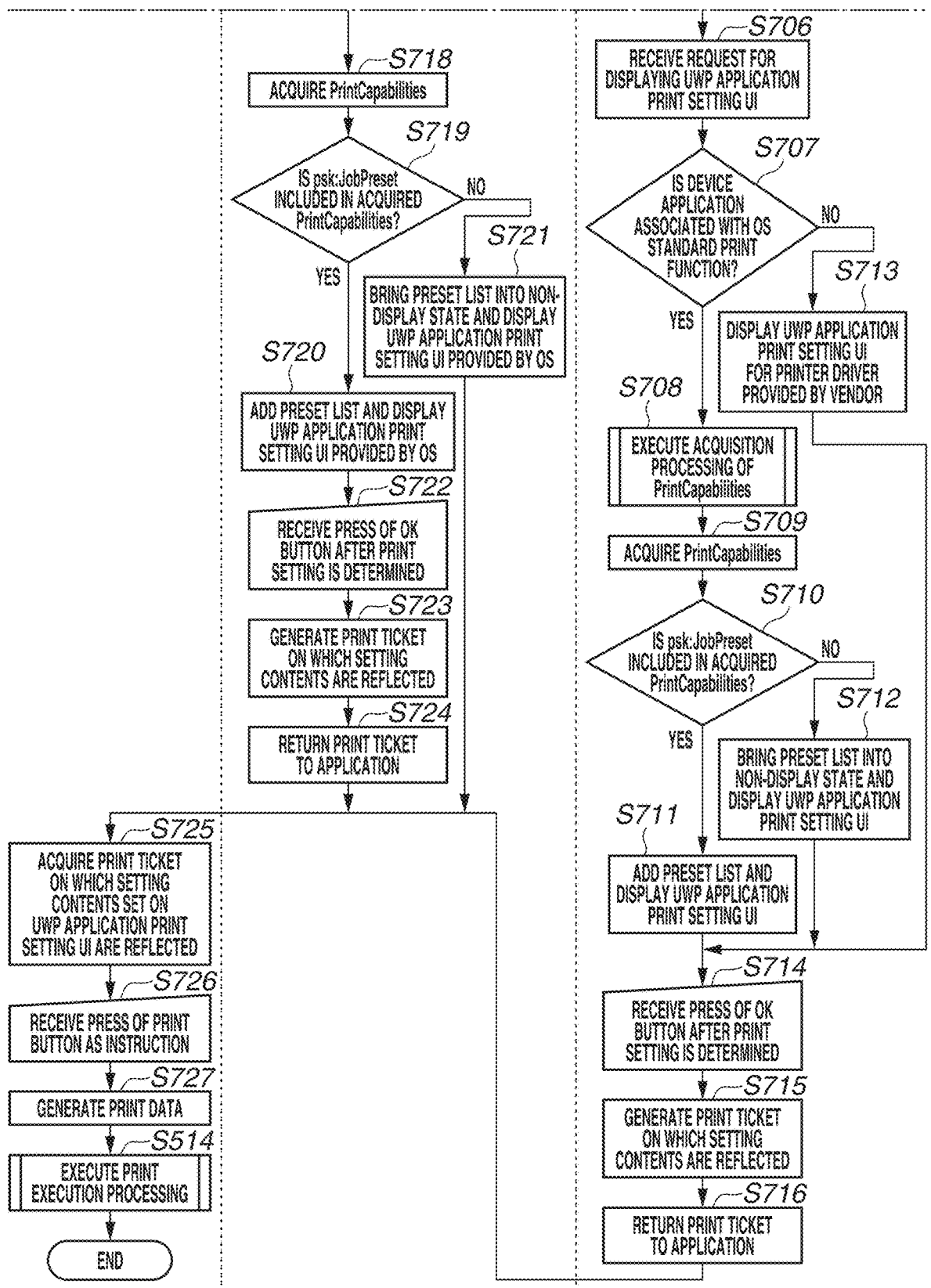

With reference to FIG. 7, which includes FIGS. 7A and 7B, processing that is executed when the OTHER-SETTINGS button 1201 is pressed in the modern print dialog 1200 will be described. The processing described in the present exemplary embodiment is implemented by the CPU 101 loading a program recorded in the auxiliary storage device 105 into the RAM 1022 in response to a user instruction and executing the program. A reference number the same as that of a step described above will be given to the processing the same as the processing executed in the above-described step, and a description thereof will be omitted unless otherwise stated.

In step S701, the UWP application 202 receives a press of the OTHER-SETTINGS button 1201. In step S702, the UWP application 202 requests the OS standard UI management unit 10532 to display the UWP application print setting UI.

In step S703, the OS standard UI management unit 10532 receives a display request of the UWP application print setting UI. Then, in step S704, the OS standard UI management unit 10532 determines whether the device application 1052 provided by a vendor has been installed in the client computer 100. If the OS standard UI management unit 10532 determines that the device application 1052 is installed (YES in step S704), the processing proceeds to step S705. In step S705, the OS standard UI management unit 10532 requests the expansion printing setting unit 10522 of the device application 1052 to display the UWP application print setting UI.

In step S706, the expansion printing setting unit 10522 receives a request for displaying the UWP application print setting UI. In step S707, the expansion printing setting unit 10522 determines whether the device application 1052 is associated with the OS standard print function 10531. More specifically, in the processing in step S707, if the device application 1052 is associated with a printer driver (not illustrated) provided by a vendor, the expansion printing setting unit 10522 determines that the device application 1052 is not associated with the OS standard print function 10531. If the expansion printing setting unit 10522 determines that the device application 1052 is associated with the OS standard print function 10531 (YES in step S707), the processing proceeds to step S708. In step S708, the expansion printing setting unit 10522 requests the OS standard print function 10531 to execute acquisition processing of the PrintCapabilities. In step S708, the above-described processing in FIG. 6A is executed.

Figure 12B:
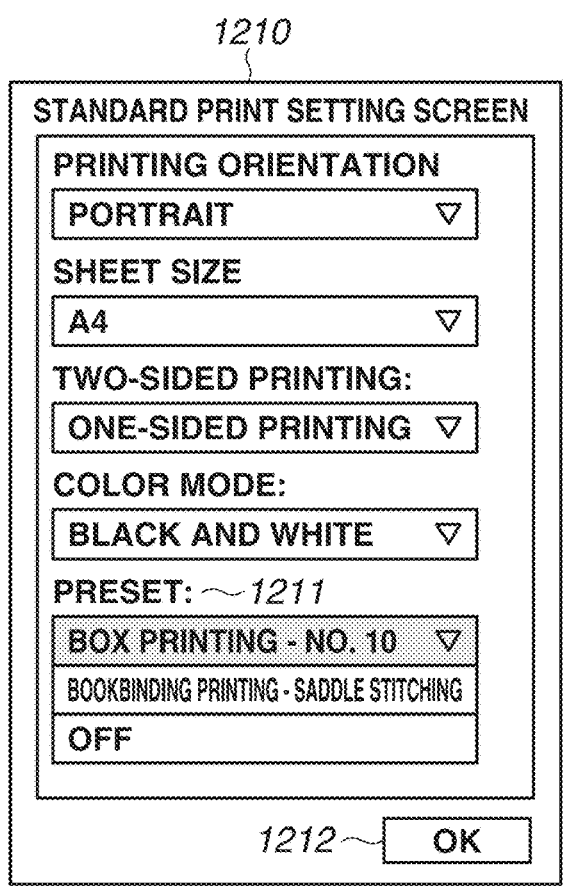
Figure 12C:
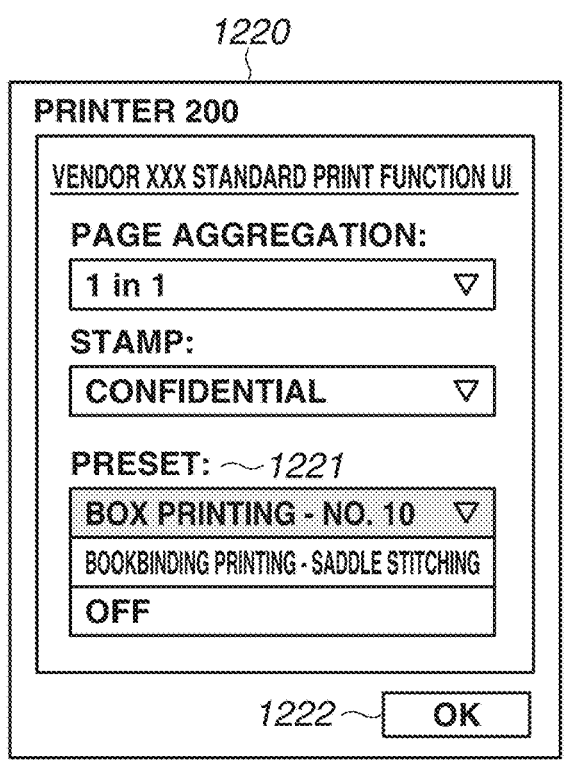

In step S709, the expansion printing setting unit 10522 acquires the PrintCapabilities from the OS standard print function 10531. In step S710, the expansion printing setting unit 10522 determines whether the psk:JobPreset is included in the PrintCapabilities. In step S710, if the expansion printing setting unit 10522 determines that the psk:JobPreset is included (YES in step S710), the processing proceeds to step S711. In step S711, the expansion printing setting unit 10522 displays the UWP application print setting UI 1220 as illustrated in FIG. 12C. In step S711, the expansion printing setting unit 10522 adds the preset setting control 1221 illustrated in FIG. 12C and displays the UWP application print setting UI 1220. A character string of a property of the psk:PresetName of each Option included in the psk:JobPreset in the PrintCapabilities 1600 is listed in the preset setting control 1221.

On the other hand, in step S710, if the expansion printing setting unit 10522 determines that the psk:JobPreset is not included (NO in step S710), the processing proceeds to step S712. In step S712, the preset setting control 1221 is brought into a non-display state, and the expansion printing setting unit 10522 displays the UWP application print setting UI 1220.

In step S707, if the expansion printing setting unit 10522 determines that the device application 1052 is not associated with the OS standard print function 10531, i.e., the device application 1052 is associated with the printer driver provided by the vendor (NO in step S707), the processing proceeds to step S713. In step S713, the expansion printing setting unit 10522 displays the UWP application print setting UI for the printer driver provided by the vendor.

In step S714, on the print setting UIs displayed in steps S711 to S713, the expansion printing setting unit 10522 receives a press of the OK button 1222 as an instruction from the user. After the OK button 1222 is pressed, in step S715, the expansion printing setting unit 10522 generates a print ticket on which the contents set on the UWP application print setting UI 1220 are reflected. In step S716, the expansion printing setting unit 10522 transmits the generated print ticket to the UWP application 202.

If the OS standard UI management unit 10532 determines that the device application 1052 provided by the vendor is not installed (NO in step S704), the processing proceeds to step S717. In step S717, the OS standard UI management unit 10532 requests the OS standard print function 10531 to acquire the PrintCapabilities. In step S717, the acquisition processing of the PrintCapabilities described above with reference to FIG. 6A is executed.

In step S718, the OS standard UI management unit 10532 acquires the PrintCapabilities. In step S719, the OS standard UI management unit 10532 determines whether the psk:JobPreset is included in the PrintCapabilities. If the OS standard management unit 10532 determines that the psk:JobPreset is included (YES in step S719), the processing proceeds to step S720. In step S720, the OS standard UI management unit 10532 displays the UWP application print setting UI 1210 provided by the OS as illustrated in FIG. 12B. In step S720, the OS standard UI management unit 10532 adds the preset setting control 1221 illustrated in FIG. 12B thereto and displays the UWP application print setting UI 1210. A character string of a property of the psk:PresetName of each Option included in the psk:JobPreset in the PrintCapabilities 1600 is listed in the preset setting control 1211.

In step S719, if the OS standard UI management unit 10532 determines that the psk:JobPreset is not included in the PrintCapabilities (NO in step S719), the processing proceeds to step S721. In step S721, the OS standard UI management unit 10532 brings the preset setting control 1221 into a non-display state and displays the UWP application print setting UI 1210.

In step S722, a print setting including the preset is determined by a pressing operation of the OK button 1212 on the UWP application print setting UI 1210. In step S723, the OS standard UI management unit 10532 generates a print ticket on which the contents set on the UWP application print setting UI 1210 are reflected. At this time, a setting value of the preset setting control 1211 is reflected on the psk:JobPreset described in the print ticket. In step S724, the OS standard UI management unit 10532 returns the generated print ticket to the UWP application 202.

In step S725, the UWP application 202 acquires the print ticket on which the setting contents set on the UWP application print setting UI 1210 or the UWP application print setting UI 1220 are reflected. In step S726, the UWP application 202 receives a press of a print button 1202 performed on the modern print dialog 1200 as an instruction from the user. In step S727, the UWP application 202 generates print data. The print data generated in step S727 includes the print ticket acquired in step S725. After the print data is generated, in step S514, the UWP application 202 executes the print execution processing described above with reference to FIG. 6B.

The processing that is executed when the OTHER-SETTINGS button 1201 is pressed on the modern print dialog 1200 has been described above. According to the present exemplary embodiment, the user can execute print processing on the printer 200 using the expansion function that is not supported by the OS standard print function 10531 by specifying the preset on the UI 1210 or 1220 displayed when the OTHER-SETTINGS button 1201 is pressed.

In a third exemplary embodiment, an embodiment of displaying a preset list on a print setting UI provided by the OS standard print function 10531 will be described.

Figure 13B:
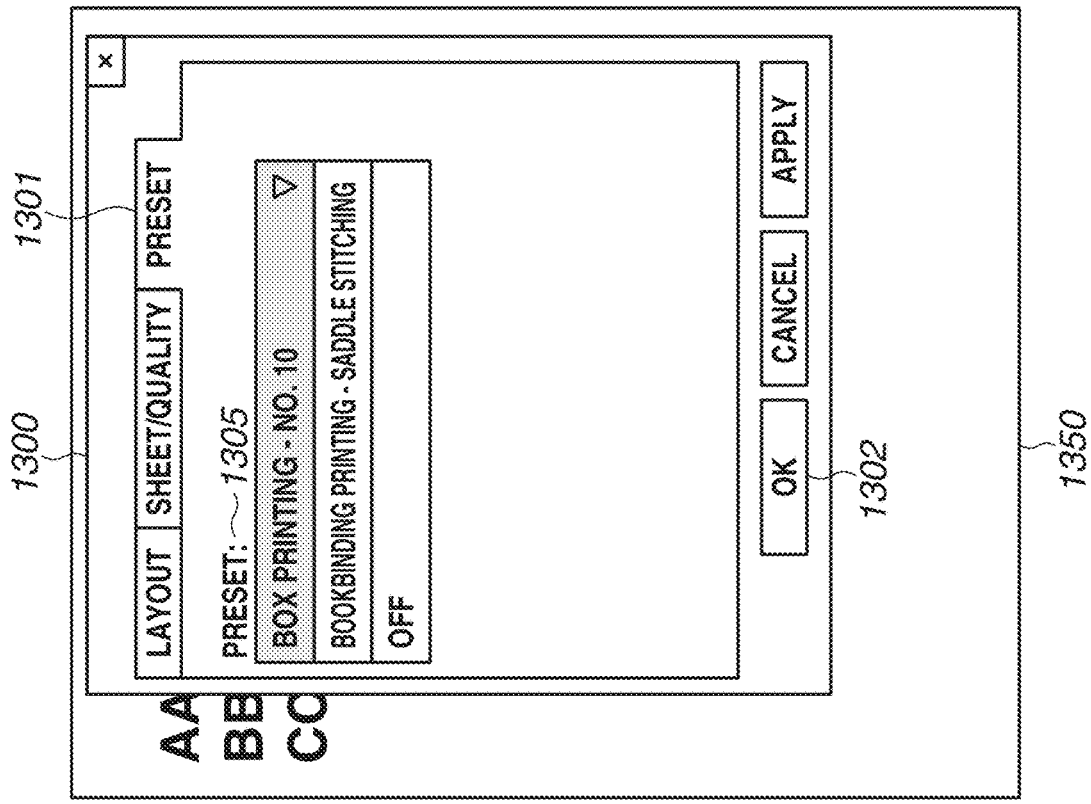
FIGS. 13A and 13B are diagrams each illustrating an example of a print setting screen of a desktop application.
Figure 13A:
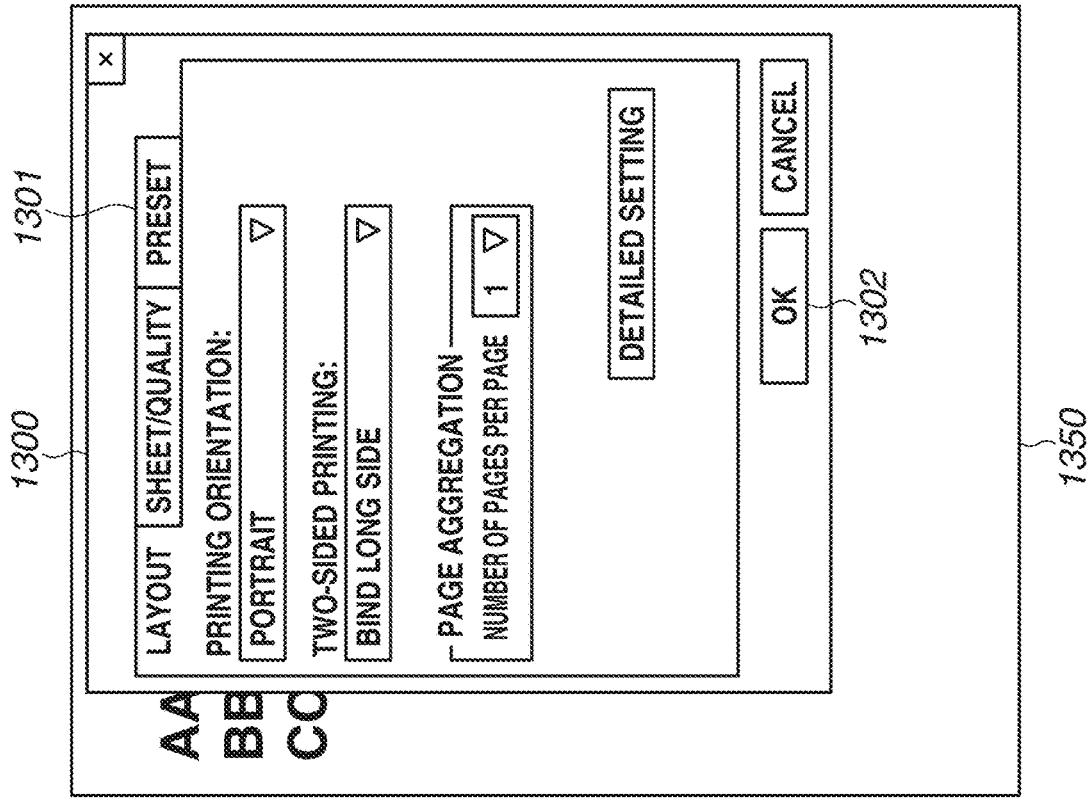

FIG. 13A is a diagram illustrating an example of the print setting UI displayed by the desktop application 201 serving as a rendering application. If a preset tab 1301 is selected, a screen including a preset list is displayed. In the present exemplary embodiment, a preset list is displayed in FIG. 13B.

Figure 8B:
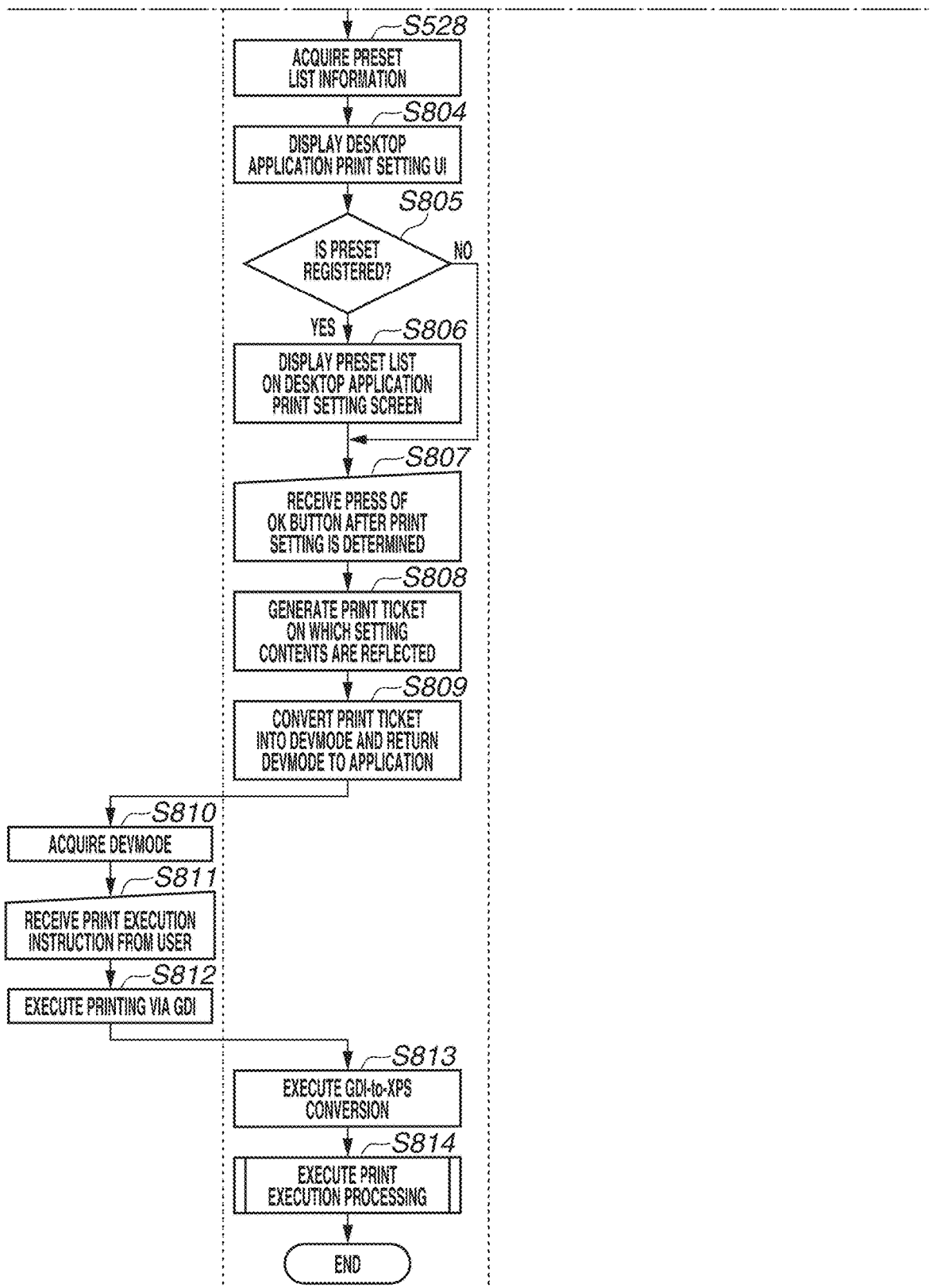

With reference to FIG. 8, which includes FIGS. 8A and 8B, processing to be executed in a case where an instruction for displaying the desktop application print setting UI is given on the screen 1135 provided by the desktop application 201 will be described. The processing is implemented by the CPU 101 loading a program recorded in the auxiliary storage device 105 into the RAM 1022 in response to a user instruction and executing the program. A reference number the same as that of a step described above will be given to the processing the same as the processing executed in the above-described step, and a description thereof will be omitted unless otherwise stated.

First, in step S801, the desktop application 201 receives an instruction for displaying a detailed setting on a screen 1135 provided by the desktop application 201. In step S802, the desktop application 201 requests the standard print setting management unit 208 to display a print setting UI.

In step S803, the standard print setting management unit 208 receives a request for displaying the print setting UI. After the preset list is acquired through the processing in steps S521 to S528, in step S804, the standard print setting management unit 208 displays a desktop application print setting UI 1300 as illustrated in FIG. 13A. The setting items supported by the OS standard print function 10531 are displayed on the desktop application print setting UI 1300. In FIG. 13A, while the preset tab 1301 is displayed thereon, an embodiment not displaying the preset tab 1301 is also possible in a case where it is determined that use of the expansion function is not permitted in step S524.

In step S805, based on the preset list information 1700 acquired in step S528, the standard print setting management unit 208 determines whether the preset is registered in the printer 200. If the standard print setting management unit 208 determines that the preset is registered (YES in step S805), the processing proceeds to step S806. In step S806, the standard print setting management unit 208 displays the acquired preset list information 1700 on the preset tab 1301 (FIG. 13B). Names of presets in the preset list information 1700 are listed in the preset setting control 1305. If the standard print setting management unit 208 determines that the acquired preset list is empty or the preset is not registered (NO in step S805), the preset setting control 1305 is not displayed on the preset tab 1301, and the processing proceeds to step S807.

In step S807, the print setting is determined by the user pressing the OK button 1302 on the desktop application print setting UI 1300. In step S808, the standard print setting management unit 208 generates a print ticket on which the print setting contents are reflected. FIG. 16B is a diagram illustrating an example of the generated print ticket. A setting value of the preset setting control 1305 is reflected on the psk:JobPreset of the print ticket. In step S809, the standard print setting management unit 208 converts the print ticket into the DEVMODE, and returns the DEVMODE to the desktop application 201.

In step S810, the desktop application 201 acquires the DEVMODE on which the contents set on the desktop application print setting UI 1300 are reflected. Next, in step S811, the desktop application 201 receives the print execution instruction from the user on the screen 11350. In step S812, the desktop application 201 specifies the DEVMODE, which is the print setting information acquired in step S810, to execute printing via the GDI, which is a module of the OS 1053.

After the desktop application 201 executes the printing, in step S813, the GDI-to-XPS conversion module 207 converts the GDI rendering data received from the desktop application 201 into XPS data. At this time, the DEVMODE specified in step S812 is converted into the print ticket, which is the print data processible by the standard print processing unit 212. After the rendering data is converted into the print data, in step S814, the OS standard print function 10531 instructs the standard print processing unit 212 to execute printing. The print execution processing in step S814 has already been described above with reference to FIG. 6B. A flow of displaying the preset list on the print setting UI provided by the OS standard print function 10531 and executing the print execution processing has been described above.

According to the present exemplary embodiment, by specifying the preset via the detailed setting display displayed by the desktop application 201, the user can execute print processing on the printer 200 by using the expansion function that is not supported by the OS standard print function 10531.

In a fourth exemplary embodiment, processing for displaying a preset list on a UI provided by the printing start-up application unit 10521 included in the device application 1052 will be described as an example. In the present exemplary embodiment, while an embodiment in which a print instruction is received via the UWP application 202 is described as an example, the present disclosure is also applicable to an embodiment in which the print instruction is received via the desktop application 201.

Figure 9:
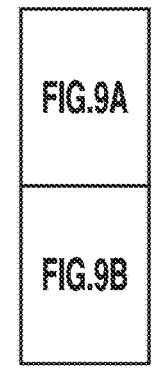
FIG. 9, which includes
Figure 9A:
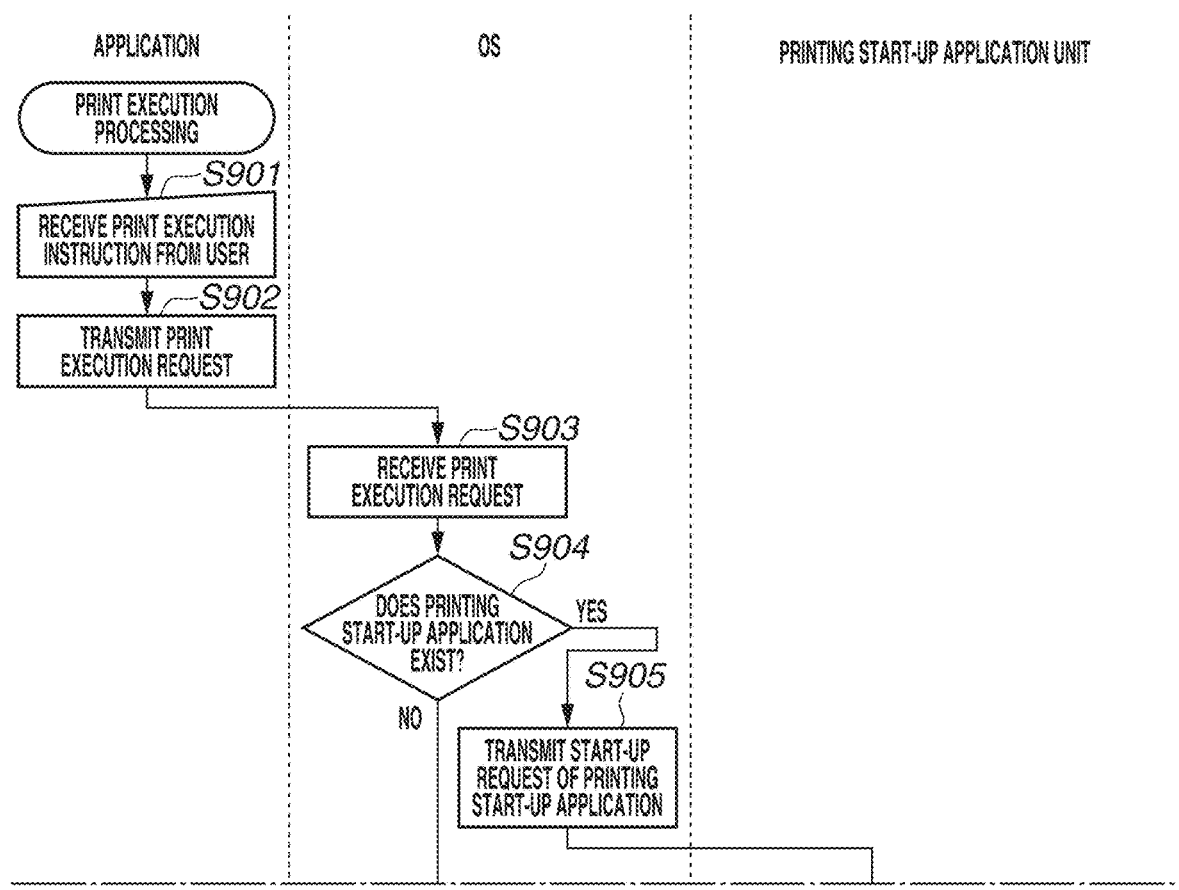
FIGS. 9A and 9B, is a flowchart illustrating display processing of a UI for a printing start-up application according to a fourth exemplary embodiment.
Figure 9B:
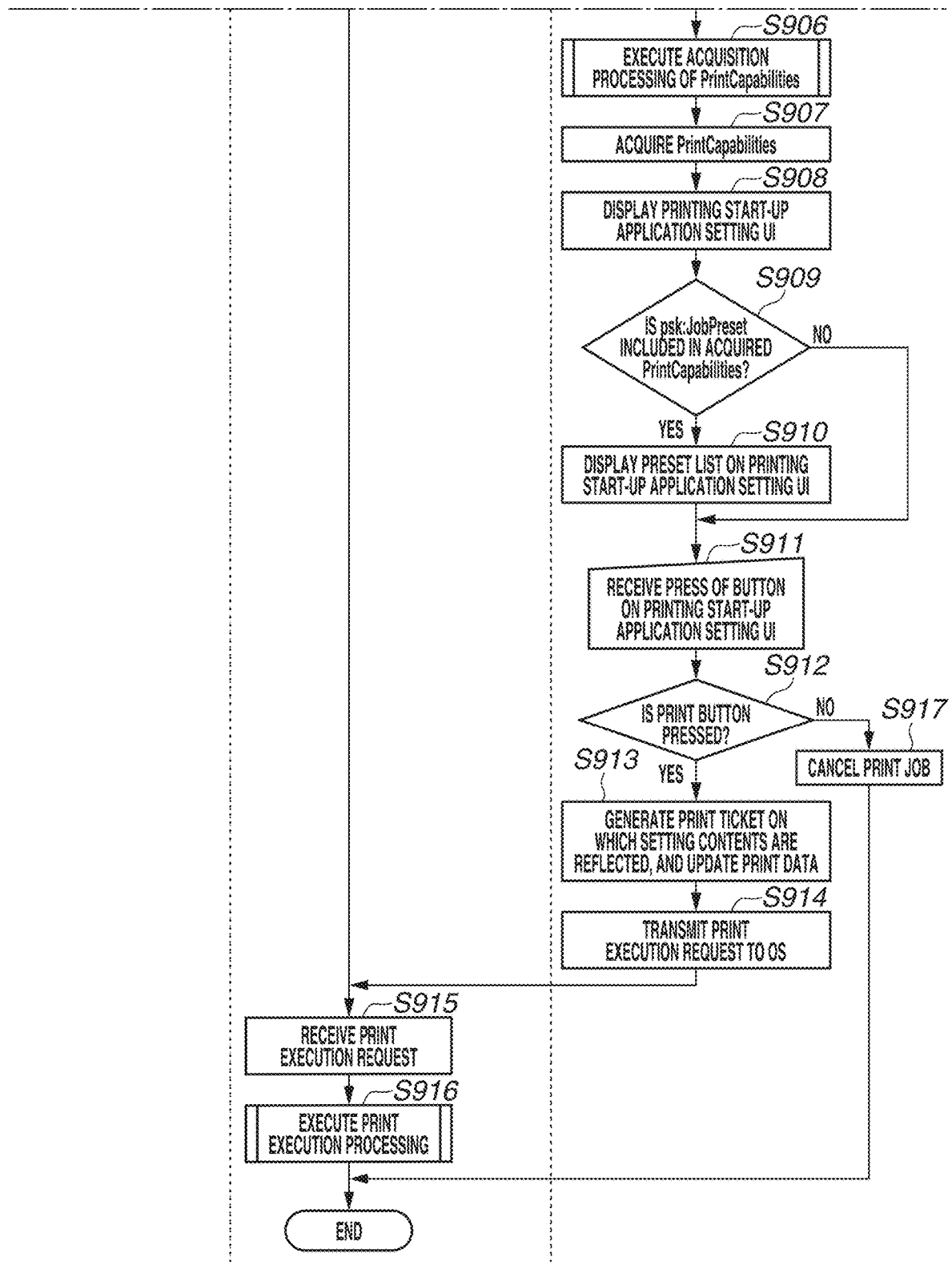

Processing to be executed in a case where printing is executed by using the UWP application 202 will be described with reference to FIG. 9, which includes FIGS. 9A and 9B. The processing described in the present exemplary embodiment is implemented by the CPU 101 loading a program recorded in the auxiliary storage device 105 into the RAM 1022 in response to a user instruction and executing the program. A reference number the same as that of a step described above will be given to the processing the same as the processing executed in the above-described step, and a description thereof will be omitted unless otherwise stated.

In step S901, the UWP application 202 receives a print execution instruction on a screen provided by the UWP application 202. In step S902, the UWP application 202 transmits a print execution request to the OS 1053.

In step S903, the OS 1053 receives the print execution request from the UWP application 202. In step S904, in response to an instruction from the OS 1053, the printing start-up application launcher 10533 determines whether the printing start-up application exists in the client computer 100. More specifically, in this processing, the printing start-up application launcher 10533 determines whether the printing start-up application unit 10521 exists in the device application 1052.

If the printing start-up application launcher 10533 determines that the printing start-up application exists (YES in step S904), the processing proceeds to step S905. In step S905, the printing start-up application launcher 10533 transmits a start-up request to the printing start-up application unit 10521. When the start-up request is transmitted, the XPS data and print data of the print ticket generated by the UWP application 202 are transmitted to the printing start-up application unit 10521 from the printing start-up application launcher 10533. After the printing start-up application unit 10521 is started, in step S906, the printing start-up application unit 10521 requests the OS standard print function 10531 to acquire the PrintCapabilities. The processing for acquiring the PrintCapabilities has been described above with reference to FIG. 6A.

In step S907, the printing start-up application unit 10521 acquires the PrintCapabilities from the OS standard print function 10531. In step S908, the printing start-up application unit 10521 displays a printing start-up application setting UI 1400 illustrated in FIG. 14. A setting area 1401 for setting a function such as a page aggregation function and a stamp print function supported by the printing start-up application unit 10521 is included in the printing start-up application setting UI 1400.

Figure 14:
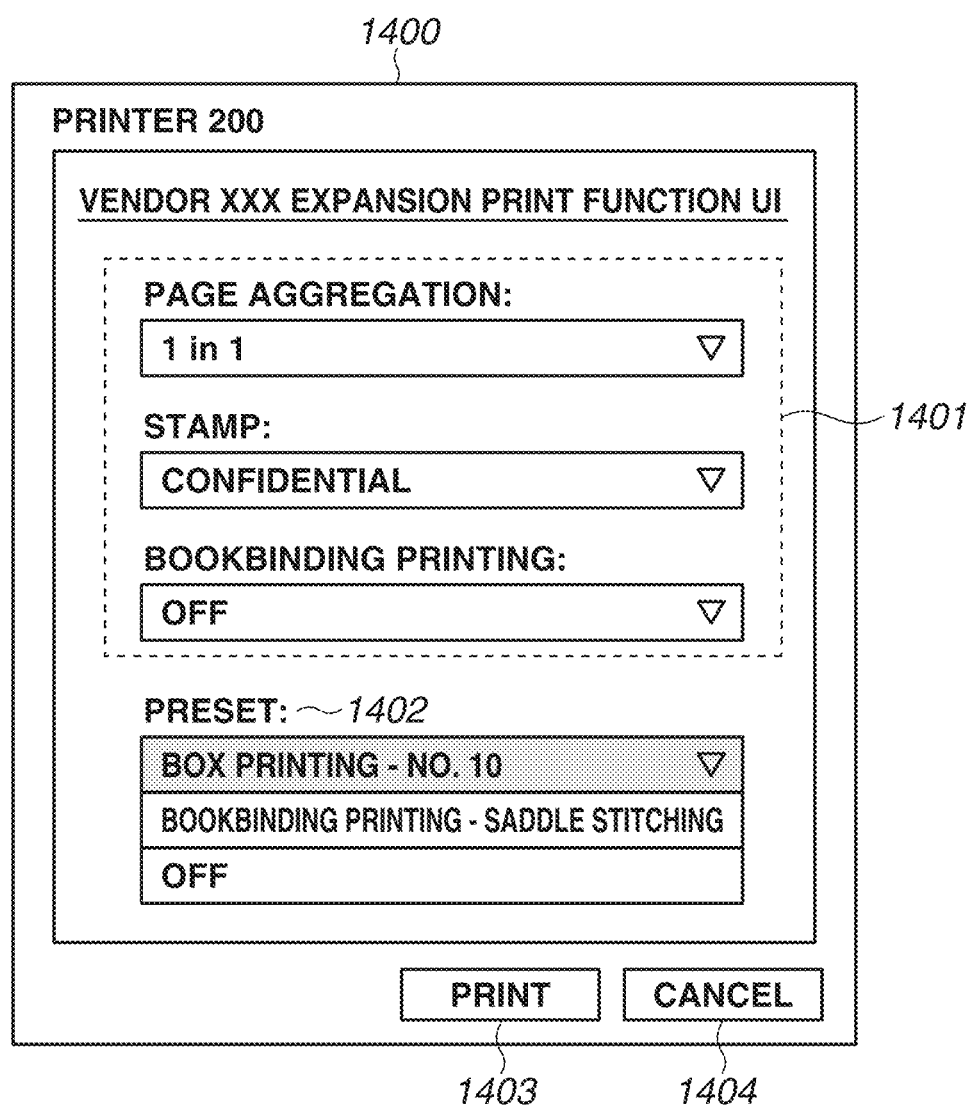
FIG. 14 is a diagram illustrating an example of a print setting screen of a UI for a printing start-up application.

In step S909, the printing start-up application unit 10521 determines whether the psk:JobPreset is included in the PrintCapabilities acquired in step S907. If the printing start-up application unit 10521 determines that the psk:JobPreset is included (YES in step S909), the processing proceeds to step S910. In step S910, a preset setting control 1402 as illustrated in FIG. 14 is displayed on the printing start-up application setting UI 1400. A character string of a property of the psk:PresetName of each Option included in the psk:JobPreset is listed in the preset setting control 1402. If the printing start-up application unit 10521 determines that the psk:JobPreset is not included in the PrintCapabilities (NO in step S909), the preset setting control 1402 is not displayed on the printing start-up application setting UI 1400.

In step S911, after setting is determined on the printing start-up application setting UI 1400 by the user operation, the printing start-up application unit 10521 receives a press of a print button 1403 or a cancel button 1404 as an instruction from the user. In step S912, the printing start-up application unit 10521 determines whether the button pressed in step S911 is the print button 1403. If the printing start-up application unit 10521 determines that the print button 1403 is pressed (YES in step S912), the processing proceeds to step S913. In step S913, the printing start-up application unit 10521 generates a print ticket on which the contents set on the printing start-up application setting UI 1400 are reflected, and updates the print data. At this time, a setting value of the preset setting control 1402 is reflected on the psk:JobPreset in the print ticket. In step S914, the printing start-up application unit 10521 returns the print data updated in step S913 to the OS 1053 and transmits a print execution request. In step S915, the printing start-up application launcher 10533 receives the print execution request from the printing start-up application unit 10521 together with the print data. In step S916, the printing start-up application launcher 10533 instructs the OS standard print function 10531 to execute the printing. The print execution processing executed in step S916 has been described with reference to FIG. 6B.

If the print button 1403 is not pressed (NO in step S912), i.e., if the printing start-up application unit 10521 determines that the cancel button 1404 is pressed, the processing proceeds to step S917. In step S917, the printing start-up application unit 10521 executes cancellation of the print job. Subsequently, although the processing is returned to the printing start-up application launcher 10533, the printing start-up application launcher 10533 ends the processing without executing the print execution processing.

The embodiment of displaying a preset list on the UI provided by the printing start-up application unit 10521 has been described above.

By processing the XPS spool file provided by the OS 1053 at the time of printing, the printing start-up application unit 10521 of the device application 1052 can provide a function for changing a layout, i.e., a layout print function for printing a plurality of pages on a single sheet face and a bookbinding print function, and a function for adding image data such as a stamp. However, a setting value managed in the preset DB 2005 and a function managed in the device application 1052 are managed by different management units. Thus, for example, even if a function of the printer 200 can be used as a preset in the modern print dialog, a function implemented by the printing start-up application unit 10521 has to be separately set on the setting screen of the device application (WSDA), so that it is troublesome to execute the setting operation.

In consideration of the above issue, in a fifth exemplary embodiment, a method for managing the function implemented by the printing start-up application unit 10521 using the preset DB 2005 and a method for registering the preset by the printing start-up application unit 10521 will be described. In the present exemplary embodiment, a case is cited where the printing start-up application unit 10521 has a bookbinding print function from among the functions that can be specified in the preset list information 1700.

Figure 10B:
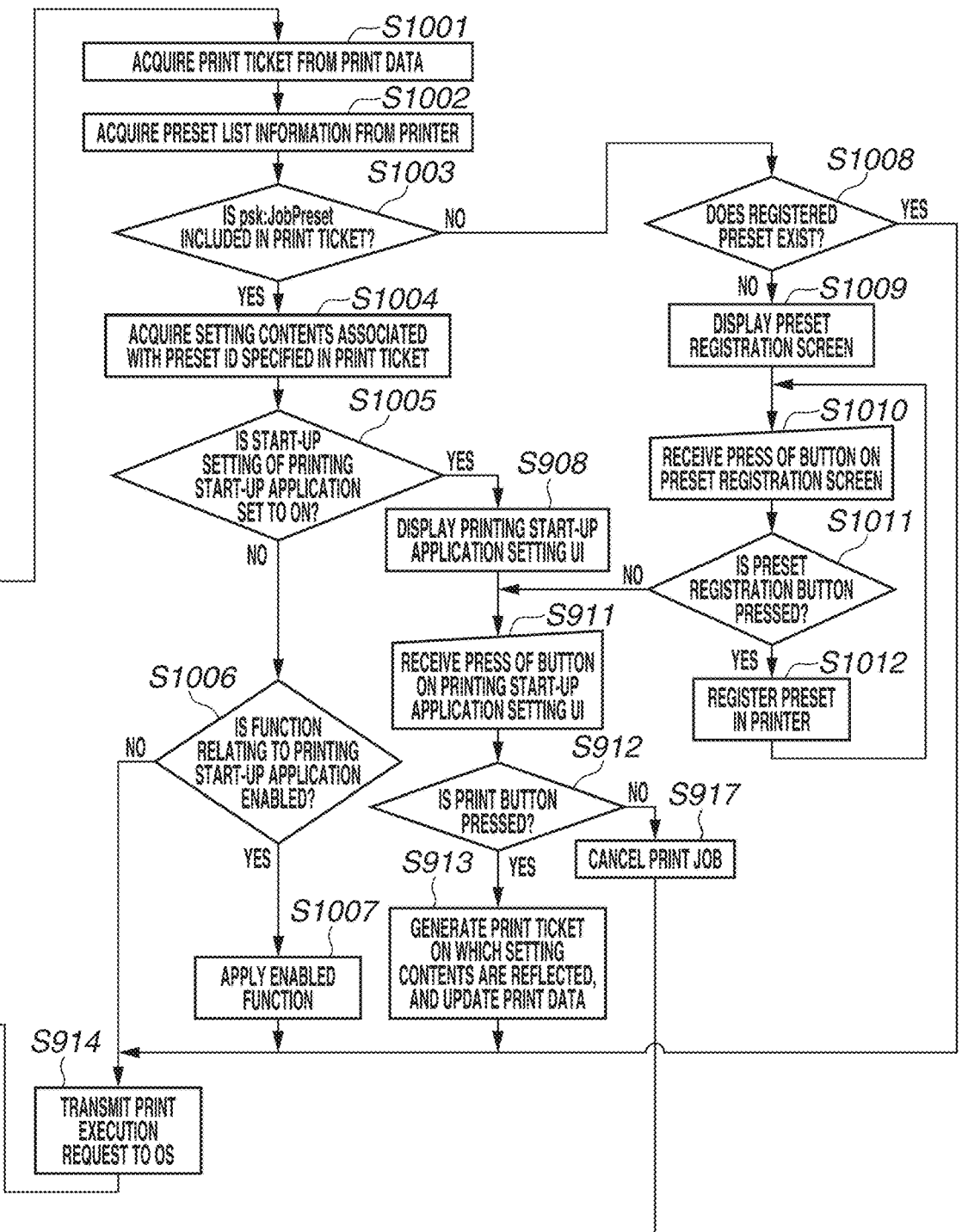

Processing to be executed when printing is executed by using the UWP application 202 will be described with reference to the flowchart in FIG. 10, which includes FIGS. 10A and 10B. The processing described in the present exemplary embodiment is implemented by the CPU 101 loading a program recorded in the auxiliary storage device 105 into the RAM 1022 in response to a user operation and executing the program. A reference number the same as that of a step described above will be given to the processing the same as the processing executed in the above-described step, and a description thereof will be omitted unless otherwise stated.

Through the processing in steps S901 to S905, the printing start-up application unit 10521 is started. In step S1001, the printing start-up application unit 10521 acquires a print ticket from the print data received in step S905. In step S1002, the printing start-up application unit 10521 acquires the preset list information 1700 from the printer 200. Each preset information in the acquired preset list information 1700 includes a start-up setting 1705 of the printing start-up application.

In step S1003, the printing start-up application unit 10521 determines whether the psk:JobPreset is included in the print ticket acquired in step S1001. In step S1003, if the printing start-up application unit 10521 determines that the psk:JobPreset is included (YES in step S1003), the processing proceeds to step S1004. In step S1004, the printing start-up application unit 10521 acquires setting contents associated with the psk:PresetID of the psk:JopPreset specified in the print ticket, from the preset list information 1700 acquired in step S1002. In step S1005, the printing start-up application unit 10521 determines whether a value of the start-up setting 1705 of the printing start-up application acquired in step S1004 is ON. If the printing start-up application unit 10521 determines that the value is ON (YES in step S1005), the processing is ended after the processing in steps S908 and S911 to S917 is executed.

If the printing start-up application unit 10521 determines that the value is not ON (NO in step S1005), the processing proceeds to step S1006. In step S1006, the printing start-up application unit 10521 determines whether the function relating to the printing start-up application unit 10521 described in the setting acquired in step S1004 is enabled. In the present exemplary embodiment, in a case where the function relating to the printing start-up application unit 10521 is a bookbinding print function, in step S1006, if the bookbinding print function of the print setting information 1703 is set to ON, it is determined that the function relating to the printing start-up application unit 10521 is enabled. In step S1006, if the printing start-up application unit 10521 determines that the function relating thereto is enabled (YES in step S1006), the processing proceeds to step S1007. In step S1007, the printing start-up application unit 10521 applies the enabled function to update the print data. In the present exemplary embodiment, after the printing start-up application unit 10521 executes layout processing of the bookbinding printing on the print data received from the printing start-up application launcher 10533, the processing in steps S914 to S916 is executed, and the processing is ended.

On the other hand, in step S1003, if the printing start-up application unit 10521 determines that the psk:JobPreset is not included (NO in step S1003), the processing proceeds to step S1008. In step S1008, the printing start-up application unit 10521 determines whether a preset in which the preset list information 1700 acquired in step S1002 is registered in advance exists. In step S1008, if the printing start-up application unit 10521 determines that the registered preset exists (YES in step S1008), the processing in steps S914 to S916 is executed. Then, the processing is ended. Herein, the registered preset refers to a preset registered on the screens in FIGS. 15A, 15B, 15C, and 15D described below.

In step S1008, if the printing start-up application unit 10521 determines that the registered preset does not exist (NO in step S1008), the processing proceeds to step S1009. In step S1009, the printing start-up application unit 10521 displays a preset registration screen 1530 illustrated in FIG. 15D. The preset registration screen 1530 includes a registered preset list 1521, a preset registration button 1522, a registration preset name 1523, a preset print setting information area 1524, a non-display checkbox 1531, a print button 1532, and a cancel button 1533. If the user checkmarks and enables the non-display checkbox 1531 and executes printing by pressing the print button 1532, this preset registration screen 1530 will not be displayed when printing is executed next time even if the preset is not registered. To register the preset, the user specifies a preset name to be registered in the registration preset name 1523, specifies a desired print setting in the preset print setting information area 1524, and presses the preset registration button 1522.

In step S1010, the printing start-up application unit 10521 receives a press of any one button from among the preset registration button 1522, the print button 1532, and the cancel button 1533 as an instruction from the user. In step S1011, the printing start-up application unit 10521 determines whether the button pressed in step S1010 is the preset registration button 1522. In step S1011, if the printing start-up application unit 10521 determines that the preset registration button 1522 is pressed (YES in step S1011), the processing proceeds to step S1012. In step S1012, the printing start-up application unit 10521 transmits a preset registration request to the printer 200 via the device application communication unit 10524. At this time, the information specified in the registration preset name 1523 and the preset print setting information area 1524 is transmitted to the printer 200. The data communication unit 2001 of the printer 200 receives the preset registration request, and registers the specified preset name and the print setting information to the preset DB 2005 together with a newly-generated unique preset ID via the preset management unit 2004. After the processing in step S1012, the processing returns to step S1010, so that the processing is executed continuously.

On the other hand, in step S1011, if the printing start-up application unit 10521 determines that the preset registration button 1522 is not pressed (NO in step S1011), the processing in steps S911 to S917 is executed, and the processing is ended.

Through the processing according to the present exemplary embodiment, generation of print data and print execution processing can be executed by using the function provided to the device application 1052 and the function managed as a preset by the printer 200.

A purpose of the present disclosure can be also achieved by executing the following processing. In other words, a storage medium storing a program code of software for implementing the functions of the above-described exemplary embodiments is supplied to a system or an apparatus, so that a computerized configuration(s) (or a CPU, a micro processing unit (MPU), or the like) of the system or the apparatus reads the program code stored in the storage medium. In this case, the program code read from the storage medium implements the functions described in the above exemplary embodiments, and thus the program code and the storage medium storing that program code constitute the exemplary embodiments of the present invention.

According to the present exemplary embodiments, expansion functions provided by various printing apparatuses can be used in the print processing system that is supplied only with a class driver and is under restriction on installation of a desktop application.

In a client computer having an OS such as Windows 10, the user can use expansion functions provided by various printing apparatuses. In this regard, there is considered a configuration that enables a printing application to manage the print setting information of the expansion functions to provide a desired expansion function to the user. In the above-described system, it is possible to reduce a burden of the preliminary operation for thoroughly setting expansion functions of various printing apparatuses to a printing application and making the printing application manage the expansion functions.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present invention can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-065505, filed Mar. 29, 2018, which is hereby incorporated by reference herein in its entirety.

What is claimed is:

1. A print processing system comprising:
an image processing apparatus configured to execute print processing; and
a client apparatus configured to transmit printing data to the image processing apparatus,
wherein the image processing apparatus comprises:
one or more processors which cause the image processing apparatus to function as:
a registration unit configured to, based on a registration instruction received via a network, register a plurality of setting items in association with an identification value;
a first transmission unit configured to, in response to a request received from the client apparatus, transmit the identification value,
wherein the client apparatus comprises:
one or more processors which cause the client apparatus to function as:
an acquisition unit configured to acquire, from the image processing apparatus, the identification value that specifies the plurality of setting items registered by the registration unit of the image processing apparatus;
a display unit configured to display a print setting screen based on the acquired identification value;
a receiving unit configured to receive a user operation for selecting the acquired identification value via the displayed print setting screen; and
a second transmission unit configured to transmit, to the image processing apparatus, the printing data for causing the image processing apparatus to execute the print processing to which the plurality of setting items associated with the selected identification value is applied.

2. The print processing system according to claim 1, wherein the identification value is a name of a preset registered in the image processing apparatus as a set of the plurality of setting items.

3. The print processing system according to claim 1,
wherein the image processing apparatus further includes a first determination unit configured to determine whether the print processing is executed by using the identification value, and
wherein the first transmission unit transmits the identification value to the client apparatus in a case where the first determination unit determines that execution of the print processing using the identification value is permitted.

4. The print processing system according to claim 1,
wherein the second transmission unit transmits a print data that includes an identification value for identifying the registered plurality of print settings, and
wherein the image processing apparatus further includes:
a second determination unit configured to determine whether or not the received print data is print data that contains the identification value registered in the image processing apparatus,
wherein, in a case where the second determination unit determines that the received print data is print data that contains the identification value registered in the image processing apparatus, the image processing apparatus executes the print processing to which the plurality of print settings associated with the identification value registered in the image processing apparatus is applied.

5. The print processing system according to claim 1,
wherein the client apparatus further includes a third determination unit configured to determine whether a device application serving as an application for supplementing a print setting of a class driver is associated with the class driver,
wherein, in a case where the third determination unit determines that the device application is associated with the class driver, the display unit displays a first print setting screen by using the device application, and
wherein, in a case where the third determination unit determines that the device application is not associated with the class driver, the display unit displays a second print setting screen by using the class driver.

6. The print processing system according to claim 5, wherein a print setting screen that is displayed by a store application that is under restriction on access to a registry further includes a selection unit for displaying at least one of the first print setting screen and the second print setting screen.

7. The print processing system according to claim 1, wherein the identification value is a value set by a user.

8. The print processing system according to claim 1, wherein the registration unit received the registration instruction from an apparatus different from the image processing apparatus which has a display configured to receive a user operation.

9. The print processing system according to claim 1, wherein the registration unit received the registration instruction via a network interface of the image processing apparatus.

10. A information processing apparatus comprising:
one or more processors which cause the information processing apparatus to function as:
an acquisition unit configured to acquire, from an image processing apparatus, an identification value that is registered to the image processing apparatus via a network, wherein the identification value is registered in association with a plurality of setting items;
a display control unit configured to display a print setting screen based on the acquired identification value; and
a receiving unit configured to receive a user operation for selecting the acquired identification value via the displayed the print setting screen;
a transmission unit configured to transmit, to the image processing apparatus, printing data for causing the image processing apparatus to execute print processing to which the plurality of setting items associated with the selected identification value is applied.

11. The information processing apparatus according to claim 10, wherein the network is a wireless network based on a predetermined protocol or Ethernet.

12. The print processing system according to claim 1, wherein the network is a wireless network based on a predetermined protocol or Ethernet.

13. The print processing system according to claim 1, wherein the registration unit received the registration instruction from the client apparatus.

14. A control method of a print processing system including an image processing apparatus that executes print processing and a client apparatus that transmits printing data to the image processing apparatus, the control method comprising:
based on a registration instruction received via a network, registering a plurality of setting items in association with an identification value;
in response to a request received from the client apparatus, transmitting the identification value,
acquiring, from the image processing apparatus, the identification value that specifies the registered plurality of setting items;
displaying a print setting screen based on the acquired identification value;
receiving a user operation for selecting the acquired identification value via the displayed print setting screen; and
transmitting, to the image processing apparatus, the printing data for causing the image processing apparatus to execute the print processing to which the plurality of setting items associated with the selected identification value is applied.

15. The information processing apparatus according to claim 10, wherein the identification information is registered to the image processing apparatus via a network interface of the image processing apparatus.

16. The information processing apparatus according to claim 15,
wherein the acquisition unit acquires, from the image processing apparatus to which a plurality of identification values is registered, the plurality of identification values, and
wherein the display control unit displays the acquired plurality of identification values in a selectable manner.

17. The information processing apparatus according to claim 15,
wherein the transmission unit transmits, to the image processing apparatus, the printing data that contains the identification value selected by the user operation.

18. The information processing apparatus according to claim 15,
wherein the acquisition unit includes a determination unit configured to determine whether or not the identification value has been acquired from the image processing apparatus, and
wherein the display control unit causes an area for accepting a user instruction for using the identification value to be displayed on a screen in a case where the determination unit determines that the identification value has been acquired, and the display control unit does not cause the area to be displayed on the screen in a case where the determination unit determines that the identification value has not been acquired.

19. The information processing apparatus according to claim 15, wherein the identification value is registered based on a registration instruction from an apparatus different from the image processing apparatus which has a display configured to receive a user operation.

* * * * *